US012012012B2

(12) United States Patent
List et al.

(10) Patent No.: US 12,012,012 B2
(45) Date of Patent: Jun. 18, 2024

(54) ASSEMBLY FOR AUTHENTICATED COMMUNICATION OF DATA DURING RECHARGE OF AN ELECTRIC AIRCRAFT

(71) Applicant: BETA AIR, LLC, South Burlington, VT (US)

(72) Inventors: Alexander Hoekje List, South Burlington, VT (US); Vincent Moeykens, Williston, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/732,274

(22) Filed: Apr. 28, 2022

(65) Prior Publication Data

US 2023/0347775 A1 Nov. 2, 2023

(51) Int. Cl.
*B60L 53/65* (2019.01)
*B60L 53/30* (2019.01)
*B60L 53/36* (2019.01)
*B60L 53/66* (2019.01)

(52) U.S. Cl.
CPC ............ *B60L 53/65* (2019.02); *B60L 53/305* (2019.02); *B60L 53/36* (2019.02); *B60L 53/66* (2019.02); *B60L 2200/10* (2013.01)

(58) Field of Classification Search
CPC ........ B60L 53/65; B60L 53/305; B60L 53/36; B60L 53/66; B60L 2200/10
See application file for complete search history.

(56) References Cited

U.S. PATENT DOCUMENTS

| 9,889,559 | B2 | 2/2018 | Muttik |
| 10,002,468 | B2 | 6/2018 | Hamilton |
| 10,137,983 | B2 | 11/2018 | Horn |
| 10,391,876 | B2 | 8/2019 | Nordbruch |
| 10,481,896 | B2 | 11/2019 | Rocci et al. |
| 11,135,930 | B2 | 10/2021 | Traverso et al. |
| 2015/0158392 | A1* | 6/2015 | Zhao ............... B60L 53/80 320/109 |
| 2017/0110901 | A1* | 4/2017 | Amarasekara ........ H02J 50/90 |

(Continued)

FOREIGN PATENT DOCUMENTS

| DE | 202010014316 U1 | 1/2012 | |
| WO | 2015197278 | 12/2015 | |
| WO | WO-2017149451 A2 * | 9/2017 | ........... B60L 53/16 |

OTHER PUBLICATIONS

Machine translation of WO-2017149451-A2 (Year: 2023).*
Buschlinger, Plug-and-Patch: Secure Value Added Services for Electric Vehicle Charging, Aug. 26, 2019.

*Primary Examiner* — David V Henze-Gongola
(74) *Attorney, Agent, or Firm* — Hoffman Warnick LLC

(57) ABSTRACT

A assembly for authenticated communication of data during recharge of an electric aircraft is presented. The assembly includes a charging connector, wherein the charging connector is configured to mate with an electric aircraft port of the electric aircraft, and a computing device communicatively connected to the charging connector. The computing device is configured to establish a communication link with an electric aircraft, receive an authentication datum from the electric aircraft, verify the authentication datum as a function of an authentication module, and transmit an aircraft update datum to the electric aircraft as a function of the verification of the authentication datum.

20 Claims, 11 Drawing Sheets

(56) References Cited

U.S. PATENT DOCUMENTS

| | | |
|---|---|---|
| 2018/0105289 A1* | 4/2018 | Walsh .................. E06B 7/32 |
| 2018/0186473 A1 | 7/2018 | Erickson et al. |
| 2018/0284758 A1* | 10/2018 | Cella ............. G05B 23/0286 |
| 2019/0025830 A1* | 1/2019 | O'Brien ............. G05D 1/0088 |
| 2019/0190291 A1 | 6/2019 | Waters |
| 2019/0205115 A1 | 7/2019 | Gomes |

* cited by examiner

ASSEMBLY FOR AUTHENTICATED COMMUNICATION OF DATA DURING RECHARGE OF AN ELECTRIC AIRCRAFT

FIELD OF THE INVENTION

The present invention generally relates to the field of authenticated communication. In particular, the present invention is directed to an assembly for authenticated communication of data during recharge of an electric aircraft.

BACKGROUND

Authentication of identity associated with aircraft may be required in many air traffic control scenarios and at many airports, landing and refueling sites. An aircraft in the air may lose communication with institutions on the ground midflight in which the aircraft's itinerary may be changed by an authoritative figure on the ground. Aircraft's such as electric aircraft require consistent refueling in which landings are more frequent. Such landing locations are prime locations for direct communication and/or transfer of data with the electric aircraft aside from recharging purposes. Effectively and accurately verifying such an identity of an aircraft and the authenticity or validity of data communication for numerous aircrafts can be a difficult task and can pose technical challenges.

SUMMARY OF THE DISCLOSURE

In an aspect, an assembly for authenticated communication of data during recharge of an electric aircraft is presented. The assembly includes a charging connector, wherein the charging connector is configured to mate with an electric aircraft port of the electric aircraft, and a computing device communicatively connected to the charging connector. The computing device is configured to establish a communication link with an electric aircraft, receive an authentication datum from the electric aircraft, verify the authentication datum as a function of an authentication module, and transmit an aircraft update datum to the electric aircraft as a function of the verification of the authentication datum.

In another aspect, a method for authenticated communication of data during recharge of an electric aircraft is presented. The method includes mating, by a charging connector, with an electric aircraft port of the electric aircraft, establishing, by a computing device, a communication link with the electric aircraft, receiving an authentication datum from the electric aircraft, verifying, by an authentication module, the authentication datum, and transmitting, by the computing device, an aircraft update datum to the electric aircraft as a function of the verification of the authentication datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
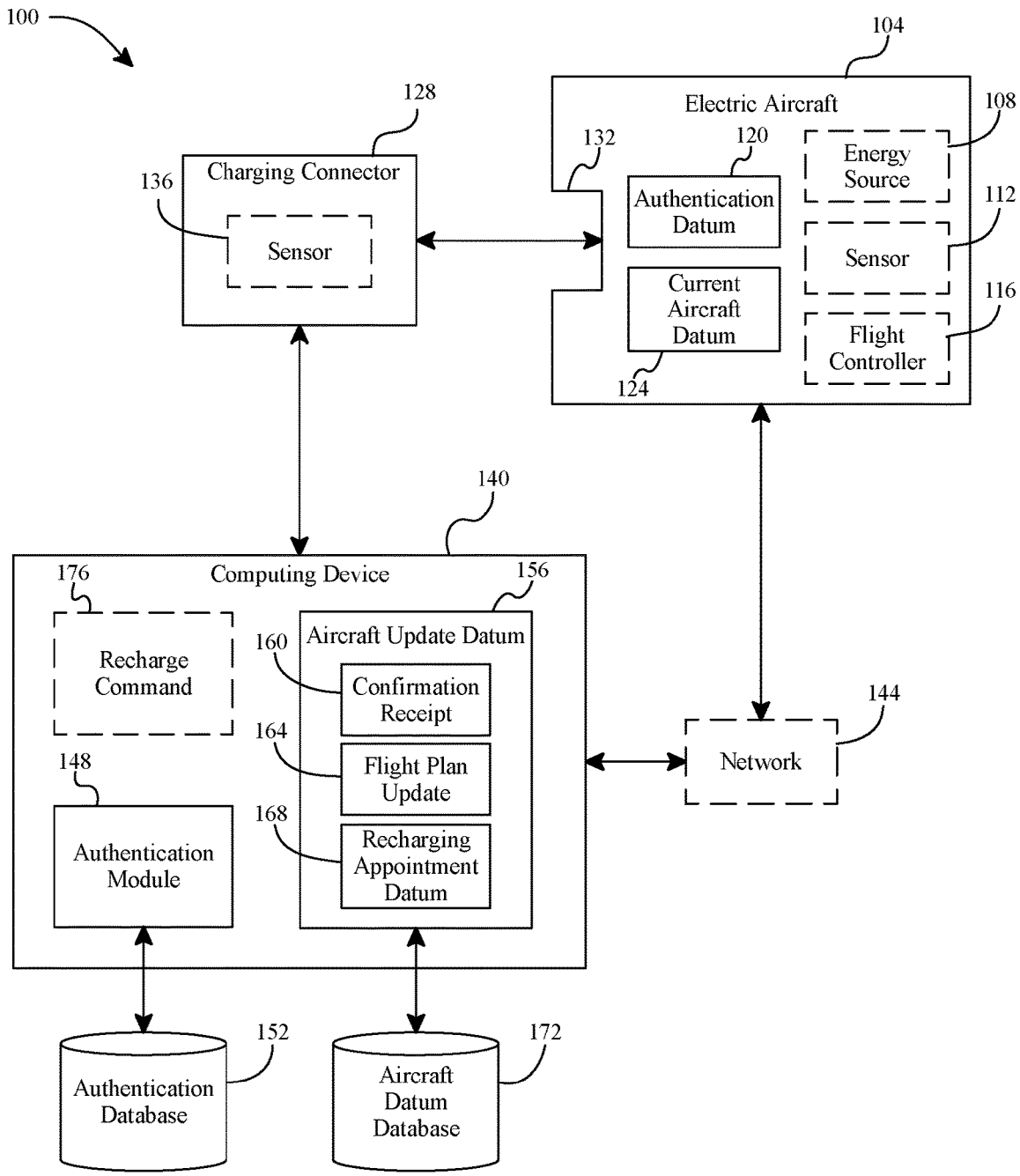
FIG. 1 is a block diagram of an exemplary embodiment of an assembly for authenticated communication of data during recharge of an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", "upward", "downward", "forward", "backward" and derivatives thereof shall relate to the orientation. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an assembly for authenticated communication of data during recharge of an electric aircraft. Aspects of the present disclosure can also be used to update or confirm if an aircraft's itinerary, flight schedule, flight plan, maintenance schedule, and the like thereof, are up to date or outdated. In an embodiment, this transfer of information may be performed at a secure location such as a charging station for an electric aircraft as it descends upon it for recharging purposes. In another embodiment, a computing device at the charging station may verify the current information that the electric aircraft possesses prior to updating it accordingly. This may include providing new information to a pilot or providing new instructions to a computing device within the electric aircraft such as a flight controller. In another embodiment, the charging station may also enable a charging connector to charge the electric aircraft that includes a specific amount of recharge the electric aircraft is allocated based on the electric aircraft's updated information and/or current information. This may include recharging the electric aircraft to a safe amount for the electric aircraft to reach a new destination provided by the updated information.

Aspects of the present disclosure can be used to verify an updated itinerary for an electric aircraft. In an embodiment, the electric aircraft may descend upon a charging station in which the charging station attempts to establish a communication link for the purposes of confirming the electric aircraft and/or providing updated information to the electric aircraft prior to recharging. The computing device of the electric aircraft such as a flight controller may verify this incoming communication link attempt and/or verify the information the charging station is attempting to provide. In another embodiment, the electric aircraft may perform this data authentication at the charging station once the electric aircraft has docked and mated with a charging connector of the charging station. In some embodiments, the charging connecter may serve as a physical connection by which a communication link may be securely establish and/or verified.

Aspects of the present disclosure can be used to authenticate an identity associated with electric aircraft for access to charging or recharging facilities. Aspects of the present disclosure can also be used to verify or confirm electric aircraft's authorization to avail the facilities of a particular recharging structure or station. This is so, at least in part, because charging connector can be configured to enable or disable flow of charging current therethrough to electric aircraft. Advantageously, aspects of the present disclosure allow for an enhanced level of logistical safety by permitting authorized or suitable electric aircraft to be provided with appropriate charging services. In an embodiment, an electric aircraft may be verified by a computing device of the charging station and/or charging connector once successfully mating with the electric aircraft and/or successfully establishing a communication link with the electric aircraft via the charging connector.

In some instances, authentication of electric aircraft at charging (or recharging) may be implemented once it is plugged into charging station, for example and without limitation, a helideck, a standalone charger, or the like, among others. In other embodiments, authentication may be performed by using a wireless connection. Any suitable authentication means may be used, such as and without limitation, verification of aircraft VIN (vehicle identification number), blockchain authentication (charger could be public/private key), and the like, among others. It could be desired, or needed, that only appropriate and/or authorized electric aircraft are able to be charged (or recharged) at a particular charging station or site. For instance, and without limitation, authentication may include verification that an aircraft is part of a fleet (e.g. fleet membership), verification that an aircraft is recharging at its scheduled appointment time, verification of other credentials such as radio frequency identification (RFID), and the like, among others. Exemplary embodiments illustrating aspects of the present disclosure are described below in the context of several specific examples In an embodiment, methods and/or an assembly described herein may perform or implement one or more aspects of a cryptographic assembly. In one embodiment, a cryptographic assembly is a assembly that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic assembly may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic assembly wishes to be able to decrypt the ciphertext. One example of a symmetric cryptographic assembly is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic assembly," in which possession of the encryption key does not make it practically feasible to deduce the decryption key, so that the encryption key may safely be made available to the public. An example of a public key cryptographic assembly is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic assembly is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic assembly, a prover runs a proving algorithm using the proving key and secret information available to the prover, and a verifier checks the proof using the verification key; public key cryptographic assembly may include RSA, elliptic curve cryptography, ElGamal, or any other suitable public key cryptographic assembly. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic assembly, or using a private key of a symmetric cryptographic assembly; for instance, trusted party may verify response by decrypting an encryption of challenge or of another datum using either a symmetric or public-key cryptographic assembly, verifying that a stored key matches the key used for encryption as a function of at least a device-specific secret. Keys may be generated by random variation in selection of prime numbers, for instance for the purposes of a cryptographic assembly such as RSA that relies prime factoring difficulty. Keys may be generated by randomized selection of parameters for a seed in a cryptographic assembly, such as elliptic curve cryptography, which is generated from a seed. Keys may be used to generate exponents for a cryptographic assembly such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic assembly. Secure proof may include any form of secure proof as described above, including without limitation encryption using a private key of a public key cryptographic assembly as described above. Signature may be verified using a verification datum suitable for verification of a secure proof; for instance, where secure proof is enacted by encrypting message using a private key of a public key cryptographic assembly, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic assembly. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an assembly 100 for authenticated communication of data during recharge of an electric aircraft is illustrated. In a non-limiting embodiment, assembly 100 may be used for any electric vehicles. As used in this disclosure, an "electric vehicle" is any electrically powered means of human transport, for example without limitation an electric aircraft or electric vertical take-off and landing (eVTOL) aircraft. In some cases, an electric vehicle or aircraft may include an energy source configured to power at least a motor configured to move the electric vehicle or aircraft. As used in this disclosure, an "electric aircraft" is an electrically powered aircraft such as one powered by one or more electric motors or the like. In some embodiments, electric (or electrically powered) aircraft may be an electric vertical takeoff and landing (eVTOL) aircraft. As also noted above, FIG. 8 illustrates electric aircraft 104 in accordance with some exemplary embodiments. In some embodiments, electric aircraft 104 includes an electric aircraft port 132. As used in this disclosure, an "electric aircraft port" is a port located on electric aircraft 104 used to mate with charging connector 128. As used in this disclosure, "mate" is an action of attaching two or more components together. Mating may be performed using a mechanical or electromechanical means described in this disclosure. For example, without limitation mating may include an electromechanical device used to join electrical conductors and create an electrical circuit. In some cases, mating may be performed by way of gendered mating components.

In a non-limiting embodiment, and with continued reference to FIG. 1, assembly 100 may be incorporated with a charging station which includes a recharging landing pad and various infrastructure and/or equipment to support the functions of the components of assembly 100. A "charging station," for the purpose of this disclosure, is a site capable of accommodating an electric vehicle for charging or recharging. Electric vehicle may include, without limitation, electric aircraft 104. In a non-limiting embodiment, assembly 100 may be used for electric aircraft 104. For instance and without limitation, the charging station may be consistent with the charging station in U.S. patent application Ser. No. 17/373,863 and titled, "ASSEMBLY FOR CHARGING FROM AN ELECTRIC VEHICLE CHARGER TO AN ELECTRIC GRID," which is incorporated in its entirety herein. In a non-limiting embodiment, the charging station may include any infrastructure that may support the landing, docking, charging, and the like thereof, of electric aircraft 104 or any electric vehicle. In some embodiments, the charging station may incorporate a platform, a deck, a pad, a port, a strip, a surface, or the like capable of supporting an aircraft, wherein, whereon and/or whereat an electric aircraft may be charged or recharged. A charging station, for example and without limitation, may house or be coupled to other components and devices such as one or more computing devices, and the like, among others. A charging structure and/or charging station may include, for example and without limitation, any infrastructure, structure, site, station, port, location, facility, building, construct, arrangement, and the like, among others which may have a deck, pad, platform, strip, and the like, among others, suitable for facilitating the landing, takeoff and/or charging of an electric aircraft. A charging station may include a designated area for an eVTOL aircraft to land on and/or takeoff from. A charging station may be made from any suitable material and may be of any dimension, as needed or desired. A charging station may include, without limitation, a helideck, helipad and/or platform. In an embodiment, charging connector 128, charging structure and/or charging station may be configured to be detectable, for example, by electric aircraft 104. For example, and without limitation, charging connector's, charging structure's and/or charging station's location may be provided on a map or the like and/or it may have the capability to emit a signal detectable, for example, by electric aircraft 104. A charging structure may also to be referred to herein as "charging infrastructure" or "recharging infrastructure." A charging structure and/or charging station may include, without limitation, one or more power sources or supplies, controllers, coolant sources or supplies, charging test ports, connectors, conductors, wires, cables, lines, and the like, among others.

In a non-limiting embodiment, and still referring to FIG. 1, A charging station may include a docking terminal. A "docking terminal," for the purposes of this disclosure, refers to an infrastructure or hub used to hold an electric aircraft and/or connect electric devices. The docking terminal may include charging connector 128 that may be connected to electric aircraft port 132 of electric aircraft 104. A charging station may be capable of providing electrical energy from a local or remote source and may be capable of allowing an aircraft to land thereat and takeoff therefrom. Persons skilled in the art, upon reviewing the entirety of this disclosure, will be aware of various embodiments of the charging station that may house or support the use of charging connector 128 for purposes as described.

In another non-limiting embodiment, and still referring to FIG. 1, a charging station may incorporate a recharging landing pad. A "recharging landing pad," for the purpose of this disclosure, is an infrastructure designed to support the landing and charging of a plurality of electric aircrafts. For instance and without limitation, the recharging landing pad may be consistent with the recharging landing pad in U.S. patent application Ser. No. 17/361,911 and title, "CHARGING STATION FOR ELECTRIC AIRCRAFTS AND A METHOD OF ITS USE," which is incorporated in its entirety herein. A recharging landing pad may incorporate assembly 100 to charge electric aircrafts and various electric vehicles. Persons skilled in the art, upon reviewing the entirety of this disclosure, will be aware of the various embodiments of a charging station in for purposes as described herein.

With continued reference to FIG. 1, assembly includes a computing device 140. computing device 140 may include any computing device as described in this disclosure, including without limitation a microcontroller, microprocessor, digital signal processor (DSP) and/or assembly on a chip (SoC) as described in this disclosure. Computing device may include, be included in, and/or communicate with a mobile device such as a mobile telephone or smartphone. computing device 140 may include a single computing device operating independently, or may include two or more computing device operating in concert, in parallel, sequentially or the like; two or more computing devices may be included together in a single computing device or in two or more computing devices. computing device 140 may interface or communicate with one or more additional devices as described below in further detail via a network interface device. Network interface device may be utilized for connecting computing device 140 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 140 may include but is not limited to, for example, a computing device or cluster of computing devices in a first location and a second computing device or cluster of computing devices in a second location. computing device 140 may include one or more computing devices dedicated to data storage, security, distribution of traffic for load balancing, and the like. computing device 140 may distribute one or more computing tasks as described below across a plurality of computing devices of computing device, which may operate in parallel, in series, redundantly, or in any other manner used for distribution of tasks or memory between computing devices. computing device 140 may be implemented using a "shared nothing" architecture in which data is cached at the worker, in an embodiment, this may enable scalability of assembly 100 and/or computing device.

With continued reference to FIG. 1, computing device 140 may be designed and/or configured to perform any method, method step, or sequence of method steps in any embodiment described in this disclosure, in any order and with any degree of repetition. For instance, computing device 140 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 140 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 10:
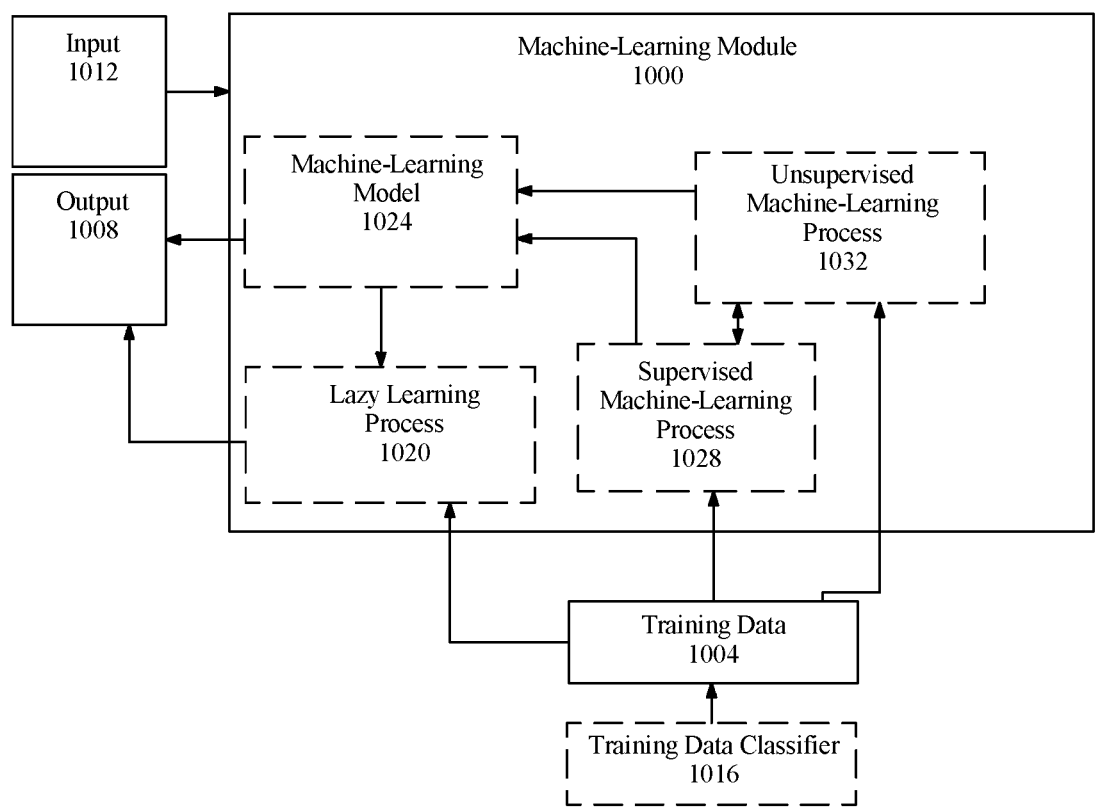
FIG. 10 is a block diagram of an exemplary machine-learning process.

In a non-limiting embodiment, and still referring to FIG. 1, computing device 140 may include a flight controller 116 of electric aircraft 136, which is also illustrated in FIG. 10 in accordance with some exemplary embodiments. In some embodiments assembly 100 may be used for any electric vehicle. As used in this disclosure, an "electric vehicle" is any electrically powered means of human transport, for example without limitation an electric aircraft or electric vertical take-off and landing (eVTOL) aircraft. In some cases, an electric vehicle or aircraft may include an energy source configured to power at least a motor configured to move the electric vehicle or aircraft. As used in this disclosure, an "electric aircraft" is an electrically powered aircraft such as one powered by one or more electric motors or the like. In some embodiments, electric (or electrically powered) aircraft may be an electric vertical takeoff and landing (eVTOL) aircraft. As also noted above, FIG. 8 illustrates an electric aircraft in accordance with some exemplary embodiments.

With continued reference to FIG. 1, electric aircraft 104 may include an energy source 108 and a sensor 112. An "energy source," as used in this disclosure, is a source (or supplier) of energy (or power) to power one or more components. For example, and without limitation, energy source 108 may be configured provide energy to an aircraft power source that in turn that drives and/or controls any other aircraft component such as other flight components. In another non-limiting example, energy source 108 may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, a battery pack, or a plurality of battery cells connected in series into a module and each module connected in series or in parallel with other modules. Configuration of an energy source containing connected modules may be designed to meet an energy or power requirement and may be designed to fit within a designated footprint in an electric aircraft. A "sensor," as used in this disclosure, a "sensor" is a device that is configured to detect an input and/or a phenomenon and transmit information related to the detection. Sensor 112 may include any computing device as described in the entirety of this disclosure and configured to convert and/or translate a plurality of signals detected into electrical signals for further analysis and/or manipulation. In a non-limiting embodiment, sensor 112 may include a plurality of sensors comprised in a sensor suite. For example and without limitation, sensor 112 may include flow sensors, temperature sensors, altimeters, pressure sensors, proximity sensors, airspeed indicators, position sensors, global positioning assembly (GPS), humidity sensors, level sensors, gas sensors, wireless sensor networks (WSN), compasses, magnetometers, altitude heading and reference systems (AHRSes), tachometers, etc. In a non-limiting embodiment, sensor 112 may include a motion sensor. A "motion sensor," for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 112 may include, but not limited to, torque sensor, gyroscope, accelerometer, magnetometer, inertial measurement unit (IMU), pressure sensor, force sensor, proximity sensor, displacement sensor, vibration sensor, and the like. In a non-limiting embodiment, sensor 112 may use of active range finding methods which may include, but not limited to, light detection and ranging (LIDAR), radar, sonar, ultrasonic range finding, forward-looking infrared (FLIR) cameras, enhanced vision systems (EVS), short wave infrared (SWIR) imagers, or the like thereof. Persons skilled in the art, upon reviewing the entirety of this disclosure, will be aware of the various types of sensors on an electric aircraft for purposes as described herein.

With continued reference to FIG. 1, components of electric aircraft 104 such as, but not limited to, energy sources, battery packs, batteries, sensors, sensor suites and/or associated methods which may efficaciously be utilized in accordance with some embodiments are disclosed in U.S. Nonprovisional application Ser. No. 17/111,002, entitled "SYSTEMS AND METHODS FOR A BATTERY MANAGEMENT ASSEMBLY INTEGRATED IN A BATTERY PACK CONFIGURED FOR USE IN ELECTRIC AIRCRAFT," U.S. Nonprovisional application Ser. No. 17/108, 798, and entitled "SYSTEMS AND METHODS FOR A BATTERY MANAGEMENT ASSEMBLY INTEGRATED IN A BATTERY PACK CONFIGURED FOR USE IN ELECTRIC AIRCRAFT," and U.S. Nonprovisional application Ser. No. 17/320,329, and entitled "SYSTEMS AND METHODS FOR MONITORING HEALTH OF AN ELECTRIC VERTICAL TAKE-OFF AND LANDING VEHICLE," the entirety of each one of which is incorporated herein by reference. These components may be communicatively connected to electric aircraft 104.

With continued reference to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, electric aircraft 104 may include an authentication datum 120 and a current aircraft datum 124. An "authentication datum," as used in this disclosure, is an element of information associated with an electric aircraft that may be used to verify an identity of the electric aircraft and/or to authorize transmission of aircraft update datum to the electric aircraft and/or charging of the electric aircraft at a particular charging structure, station or connector, and an identity of the electric aircraft or a user thereof. Authentication maybe considered to be a process or action of verifying an identity of a user or process. The same (or different) authentication may be used to authorize charging at a plurality or network of charging stations. Authentication may include, for example and without limitation, password-based authentication, multi-factor authentication, certificate-based authentication, biometric authentication, token-based authentication, and the like, among others. Authentication datum 120 may include information, data or credentials on or relating to, for example, and without limitation, vehicle identification number (VIN) of electric aircraft, radio-frequency identification (RFID) associated with electric aircraft, registration and/or licensing of aircraft and/or pilot, identity of pilot of electric aircraft (e.g. credential, license or biometric based), identity of owner of electric aircraft, membership of pilot and/or aircraft in a fleet, airline, association, club, or the like, appointment time or reservation made for charging electric aircraft, and the like, among others. In some cases, authentication datum 120 may include a password or passcode which has to be entered, additionally or alternatively, to other authentication datum, data or information. Authentication datum 120 may also be transmitted to charging connector 108 by an independent device onboard or remote from electric aircraft, for example and without limitation, from a smartphone or tablet of a pilot or other operator. In a non-limiting embodiment, authentication datum 120 may include a digital signature, for example, signed by a computing device on electric aircraft such as flight controller 116, or the like. For instance and without limitation, authentication datum 120 may be consistent with the authentication datum in U.S. patent application Ser. No. 17/562,082, and entitled, "METHODS AND SYSTEMS FOR AUTHENTICATION OF AN ELECTRIC AIRCRAFT FOR RECHARGING," which is incorporated by reference herein in its entirety.

Still referring to FIG. 1, "current aircraft datum," as used in this disclosure, is an element of information associated with an electric aircraft and its flight. Current aircraft datum 124 may include flight information such as flight plan, itinerary, flight path, cargo logistics, personnel information, aircraft history, and the like thereof. In a non-limiting embodiment, current aircraft datum 124 may be used to authorize the updating of flight information for 104. In some embodiments, current aircraft datum 124 may be up to date in which it may be used to confirm that electric aircraft 104 has the most recent flight information. Current aircraft datum 124 may include operation information such as any information describing the maintenance, repair, and overhaul of electric aircraft 104 or an electric aircraft's flight components. This may include a record of maintenance activities and their results including a plurality of tests, measurements, replacements, adjustments, repairs, and the like, that may be intended to retain and/or restore a functional unit of an electric aircraft. plurality of measured aircraft operation datum may include a record of data of, but not limited to, functional checks, servicing, repairing or replacing of necessary devices, equipment, machinery, and the like, pertaining to electric aircraft 104. In a non-limiting embodiment, current aircraft datum 124 may include a unique identification number denoting a part of electric aircraft 104 that was installed, repaired, or replaced as a function of an aircraft maintenance. In a non-limiting embodiment, the current aircraft datum 124 may include a record of maintenance and/or repair schedules corresponding to electric aircraft 104. In another non-limiting embodiment, aircraft current datum 124 may include a record of potential maintenance and repair schedules corresponding to electric aircraft 104. A "maintenance schedule," for the purposes of this disclosure, refer to an appointment reserved for an aircraft for a maintenance or repair to be conducted upon. A person of ordinary skill in the art, after viewing the entirety of this disclosure, would appreciate the various elements of data pertaining to a record of data in the context of maintenance and repair.

Still referring to FIG. 1, current aircraft datum 104 may include a component state data. A "component state data," for the purposes of this disclosure, refer to any datum that represents the status or health status of a flight component or any component of electric aircraft 104. "Flight components", for the purposes of this disclosure, includes components related to, and mechanically connected to an aircraft that manipulates a fluid medium in order to propel and maneuver the aircraft through the fluid medium. The component state data may include a plurality of state information of a plurality of aircraft components of electric aircraft 104. A state information of the plurality of state information of the plurality of aircraft components may include an aircraft flight duration, a distance of the aircraft flight, a plurality of distances of an aircraft from the surface, and the like. In some embodiments, a component state data may denote a location of the aircraft, status of the aircraft such as health and/or functionality, aircraft flight time, aircraft on frame time, and the like thereof. A component state data may include aircraft logistics of an electric aircraft of a plurality of electrical aircraft. An "aircraft logistics," for the purposes of this disclosure, refer to a collection of datum representing any detailed organization and implementation of an operation of an electric aircraft. In a non-limiting embodiment, aircraft logistics may include unique identification numbers assigned to electric aircraft 104. In a non-limiting embodiment, aircraft logistics may include a historical record of locations corresponding to electric aircraft 104 that may represent the aircraft's destination or potential destination. Aircraft logistics may include time electric aircraft 104 was in the air and a historical record of the different rate of velocity the aircraft may have commanded. In a non-limiting embodiment, a component state data may include a history of health information of an electric aircraft. In a non-limiting embodiment, a component state data may include potential health data or potential data of electric aircraft and/or electric aircraft parts that may be incorporated on to electric aircraft 104. A person of ordinary skill in the art, after viewing the entirety of this disclosure, would appreciate the type of data measured in the context of aircraft logistics.

In a non-limiting embodiment, and with continued reference to FIG. 1, current aircraft datum 124 may include a payload data. A "payload data," for the purposes of this disclosure, refer to any datum that describes the cargo of electric aircraft 104. In a non-limiting embodiment, a payload data may include information describing the logistics or aircraft logistics of a commercial application of the at least an electric aircraft. In another non-limiting embodiment, a payload data may include information about, but not limited to, the delivery location, the pickup location, the type of package and/or cargo, the priority or the package, and the like thereof. A person of ordinary skill in the art, after viewing the entirety of this disclosure, would appreciate the multitude of information for a payload data.

In another non-limiting embodiment, and still referring to FIG. 1, current aircraft datum 124 may include a measured charge data. A "measured charge data," for the purpose of this disclosure, is any information describing charging parameters of energy source 108. A "charging parameter," as used in. In a non-limiting embodiment, a measured charge data may include a collection of information describing the electric vehicle that may be charged. For example and without limitation, a measured charge data may include, but not limited to, electric current, electric charge, electric voltage, battery temperature, electric aircraft 104, and the like thereof. In a non-limiting embodiment, sensor 112 may be configured to capture any unusual data inputs such as, but not limited to, electric shock, electric overcharge, electric charge, a short connection and the like thereof. In an embodiment, sensor 112 may be configured to look for data inputs that may cause any abnormal events related to charging. For example and without limitation, sensor 112 may be configured to play closer attention to battery temperature, electric charge cycle, and the like thereof, which may be a catalyst for potential abnormal events. Persons skilled in the art, upon reviewing the entirety of this disclosure, will be aware of the various embodiments of charger related data for purposes described herein.

Still referring to FIG. 1, assembly 100 may include a connector or charging connector 128 configured to mate with electric aircraft port 132 of electric aircraft 104. A "charging connector," as used in this disclosure, is any physical connector used as a hub of transfer for electrical energy which may include a distal end of a tether or a bundle of tethers, e.g., hose, tubing, cables, wires, and the like, which is configured to removably attach with a mating component, for example without limitation electric aircraft port 132. For instance and without limitation, charging connector 128 may be consistent with the charging connector in U.S. patent application Ser. No. 17/562,082. Charging connector 128 may be used to charge and/or recharge any electric vehicle's energy storage. As used in this disclosure, "charging" or "recharging" refers to a process of increasing energy stored within an energy source. In some cases, an energy source may include at least a battery and charging may include providing an electrical flow or current to at least a battery. As used in this disclosure, an "electrical flow" or "current" is a flow of charged particles (e.g. electrons) or an electric current flowing within a material or structure which is capable of conducting it. Current may be measured in amperes or the like. As used in this disclosure, a "battery pack" is a set of any number of identical (or non-identical) batteries or individual battery cells. These may be configured in a series, parallel or a mixture of both configuration to deliver a desired electrical flow, current, voltage, capacity, or power density, as needed or desired. A battery may include, without limitation, one or more cells, in which chemical energy is converted into electricity (or electrical energy) and used as a source of energy or power.

In a non-limiting embodiment, and still referring to FIG. 1, charging connector 128 may include the charging component found in U.S. patent application Ser. No. 17/515,456, and entitled, "SYSTEMS AND METHODS FOR A SHUT-DOWN OF AN ELECTRIC CHARGER IN RESPONSE TO A FAULT DETECTION," which is incorporated by reference herein in its entirety. Charging connector 128 may include a charger. A "charger," for the purposes of this disclosure, refers to an electric device that serves as a medium to provide electricity to a battery by a charge connection. The charger may include, but not limited to, a constant voltage charger, a constant current charger, a taper current charger, a pulsed current charger, a negative pulse charger, a dumb charger, a fast charger, a smart charger, an IUI charger, a bidirectional charger, a trickle charger and/or a float charger. In a non-limiting embodiment, a recharging station may be configured to support bidirectional charging as a function of the charger. Bidirectional charging may include the transfer of electrical energy that goes two ways: from an electric grid to an EV battery or from an EV battery to an electric grid. In a non-limiting embodiment, charging station may perform bidirectional charging via the connection between charging connector 128 and electric aircraft port 132. In a non-limiting embodiment, charging station may automatically connect the charger to electric aircraft port 132. In a non-limiting embodiment, the charger is mechanically coupled to a docking terminal and protruded outward for a user to manually adjust and connect to electric aircraft port 132 of electric aircraft 104. In a non-limiting embodiment, the charger may lock itself via the charging station if the connection between electric aircraft 104 and a charging connector 128 is not formed or detected. For instance, the charger may be configured to remain locked and unusable unless an electric aircraft nearby requires charging and forms a charge connection. In a non-limiting embodiment, the charger may be unlocked to allow for use in the charging of an electric aircraft or the receiving of electric power from the electric aircraft when a charge connection is detected and/or formed. In a non-limiting embodiment, charger may incorporate a timer that is configured to allow for an electric aircraft to use the charger for the duration of the timer. For instance, once a charge connection is detected and/or formed and the electric aircraft is physically linked with the charger, a timer may begin to countdown in which the aircraft may utilize the charger before the timer runs out and the charger becomes locked. A person of ordinary skill in the art, after viewing the entirety of this disclosure, would appreciate the various charging capabilities that may be conducted.

With continued reference to FIG. 1, charging connector 128 may include a power converter. As used in this disclosure, a "power converter" is an electrical assembly and/or circuit that converts electrical energy from one form to another. For example, in some cases power converter may convert alternating current to direct current, and/or direct current to alternating current. In some cases, power converter may convert electrical energy having a first potential to a second potential. Alternative or additionally, in some cases, power converter may convert electrical energy having a first flow (i.e., current) to a second flow. As used in this disclosure, an "alternating current to direct current converter" is an electrical component that is configured to convert alternating current to digital current. An alternating current to direct current (AC-DC) converter may include an alternating current to direct current power supply and/or transformer. In some cases, the AC-DC converter may be located within an electric aircraft 104 and conductors may provide an alternating current to the electric aircraft by way of at least a charger. Alternatively and/or additionally, in some cases, AC-DC converter may be located outside of electric vehicle and an electrical charging current may be provided as a direct current to electric aircraft 104, by way of at least a charger. In some cases, AC-DC converter may be used to recharge the battery pack of electric aircraft 104. In some embodiments, power converter may have a connection to a grid power component, for example by way of at least a charger. Grid power component may be connected to an external electrical power grid. In some embodiments, grid power component may be configured to slowly charge one or more batteries in order to reduce strain on nearby electrical power grids. In one embodiment, grid power component may have an AC grid current of at least 250 amps. In some embodiments, grid power component may have an AC grid current of more or less than 250 amps. In one embodiment, grid power component may have an AC voltage connection of 280 Vac. In other embodiments, grid power component may have an AC voltage connection of above or below 280 Vac. In some embodiments, charging station may provide power to the grid power component by the electric energy stored in its own battery pack of charging connector 128 or the battery pack of an electric aircraft. In this configuration, charging station may provide power to a surrounding electrical power grid.

With continued reference to FIG. 1, in some cases, the power converter may include one or more direct current to direct current (DC-DC) converters. DC-DC converters may include without limitation any of a linear regulator, a voltage regulator, a motor-generator, a rotary converter, and/or a switched-mode power supply. In some cases, power converter may include a direct current to alternating current (DC-AC) converter. DC-AC converters may include without limitation any of a power inverter, a motor-generator, a rotary converter, and/or a switched-mode power supply. In some cases, power converter may include one or more alternating current to direct current (AC-DC) converters. AC-DC converters may include without limitation any of a rectifier, a mains power supply unit (PSU), a motor-generator, a rotary converter, and/or a switched-mode power supply. In some cases, power converter may include one or more alternating current to alternating current (AC-AC) converters. AC-AC converters may include any of a transformer, autotransformer, a voltage converter, a voltage regulator, a cycloconverter, a variable-frequency transformer, a motor-generator, a rotary converter, and/or a switched-mode power supply. In some cases, power converter may provide electrical isolation between two or more electrical circuits, for example battery pack 116 and charger. In some cases, power converter may provide a potential (i.e., voltage) step-down or step-up. In some embodiments, power converter may receive an alternating current and output a direct current. In some embodiments, power converter may receive a potential within a range of about 100 Volts to about 500 Volts. In some embodiments, power converter may output a potential within a range of about 200 Volts to about 600 Volts. In some embodiments, power converter may receive a first potential and output a second potential at least as high as the first potential. In some embodiments, power converter may be configured to receive a first current from a power source including a "Level 2" charger, such that the first current consists of an alternating current having a potential of about 240 Volts or about 120 Volts and a maximum current no greater than about 20 Amps or no greater than about 20 Amps. In some embodiments, power converter may be configured to output a second current which is comparable to that output by a "Level 5" charger, such that the second current consists of a direct current having a potential in a range between about 200 Volts and about 600 Volts.

With continued reference to FIG. 1, charging connector 128 may include one or more conductors configured to conduct, for example, a direct current (DC) or an alternating current (AC), and the like thereof. In a non-limiting embodiment, the conductor may be configured to charge or recharge, for example, the battery pack of the electric aircraft. As used in this disclosure, a "conductor" is a component that facilitates conduction. As used in this disclosure, "conduction" is a process by which one or more of heat and/or electricity is transmitted through a substance, for example when there is a difference of effort (i.e., temperature or electrical potential) between adjoining regions. In some cases, a conductor may be configured to charge and/or recharge an electric vehicle. For instance, conductor may be connected to the energy source 108 of electric aircraft 104. The conductor may be designed and/or configured to facilitate a specified amount of electrical power, current, or current type. For example, a conductor may include a direct current conductor. As used in this disclosure, a "direct current conductor" is a conductor configured to carry a direct current for recharging the battery pack of electric aircraft 104. As used in this disclosure, "direct current" is one-directional flow of electric charge. In some cases, a conductor may include an alternating current conductor. As used in this disclosure, an "alternating current conductor" is a conductor configured to carry an alternating current for recharging the battery pack of electric aircraft 104. As used in this disclosure, an "alternating current" is a flow of electric charge that periodically reverse direction; in some cases, an alternating current may change its magnitude continuously with in time (e.g., sine wave). In a non-limiting embodiment, charging connector 128 may include a ground conductor. A "ground conductor," for the purpose of this disclosure, is a conductor or a assembly or that is intentionally grounded. In a non-limiting embodiment, the ground conductor may include any suitable conductor configured to be in electrical communication with a ground. In a non-limiting embodiment, a ground is a reference point in an electrical circuit, a common return path for electric current, or a direct physical connection to the earth. The ground may include an absolute ground such as earth or ground may include a relative (or reference) ground, for example in a floating configuration. The ground conductor functions to provide a grounding or earthing path for any abnormal, excess or stray electricity. In a non-limiting embodiment, charging connector 128 may include a control signal conductor configured to conduct a control signal. A "control signal conductor," for the purpose of this disclosure, is a conductor configured to carry a control signal between charging connector 128 and computing device 140. The control signal is an electrical signal that is indicative of information. The control signal may include, for example, an analog signal, a digital signal, or the like.

With continued reference to FIG. 1, charging connector 128 may include a sensor 136. In a non-limiting embodiment, sensor 136 may be consistent with sensor 112 and/or any sensor as described herein. In a non-limiting embodiment, sensor 136 may detect nearby electric aircrafts in the air which may be descending a charging station. In a non-limiting embodiment, sensor 136 may be disposed on the charging station to detect, monitor, and maintain the descent, land, charging, and take-off of electric aircraft 104 onto the charging station. This is so, at least in part, to accurately measure electric aircraft 104 wherein sensor 136 is disposed on a location on the charging station and/or charging connector 128 that is ideal in connecting incoming electric aircrafts to the charging station for recharging. Persons skilled in the art, upon reviewing the entirety of this disclosure, will be aware of the various embodiments of a charging station and the configuration of the placement of sensor 136 for purposes as described herein.

In a non-limiting embodiment, and still referring to FIG. 1, sensor 136 may include a proximity signal conductor. As used in this disclosure, a "proximity signal conductor" is a conductor configured to carry a proximity signal. As used in this disclosure, a "proximity signal" is a signal that is indicative of information about a location of connector. In a non-limiting embodiment, charging connector 128 may be coupled to a proximity signal conductor. A proximity signal may be indicative of attachment of connector with a port, for instance electric vehicle port. In some cases, a proximity signal may include an analog signal, a digital signal, an electrical signal, an optical signal, a fluidic signal, or the like. In embodiments, a proximity signal conductor may be configured to conduct a proximity signal indicative of attachment between connector and an electric vehicle port. In one or more non-limiting exemplary embodiments, computing device 140 may be configured to receive charge parameters and/or measured charge data from current aircraft datum 124 as a function of a proximity sensor. The proximity sensor may be electrically communicative with a proximity signal conductor. In a non-limiting embodiment, a proximity sensor may be configured to generate a proximity signal as a function of connection between connector and electric vehicle port. As used in this disclosure, a "proximity sensor" is a sensor that is configured to detect at least a phenomenon related to connecter being mated to a port. The proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like.

With continued reference to FIG. 1, certain features of assemblies, methods and connectors including a charging connector, controller, sensors and associated components and devices, which may efficaciously be utilized in accordance with certain embodiments of the present disclosure are disclosed in U.S. Nonprovisional application Ser. No. 17/405,840, and entitled "CONNECTOR AND METHODS OF USE FOR CHARGING AN ELECTRIC VEHICLE," U.S. Nonprovisional application Ser. No. 17/515,512, entitled "PROXIMITY DETECTION SYSTEMS AND METHODS FOR FACILITATING CHARGING OF ELECTRIC AIRCRAFT," U.S. Nonprovisional application Ser. No. 17/515,508, entitled "CONNECTOR WITH AMBIENCE MONITORING CAPABILITY AND METHODS OF USE FOR CHARGING AN ELECTRIC AIRCRAFT," U.S. Nonprovisional application Ser. No. 17/515,515, entitled "CONNECTOR WITH OVERVOLTAGE PROTECTION AND METHODS OF USE FOR CHARGING AN ELECTRIC AIRCRAFT," U.S. Nonprovisional application Ser. No. 17/515,594, entitled "SYSTEMS AND METHODS FOR PRE-CHARGING SHORT CIRCUIT DETECTION IN ELECTRIC AIRCRAFT," and U.S. Nonprovisional application Ser. No. 17/515,521, entitled "SYSTEMS AND METHODS FOR REGULATING CHARGING OF AN ELECTRIC AIRCRAFT," the entirety of each one of which is incorporated herein by reference.

With continued reference to FIG. 1, charging connector 128 may be communicatively connected to computing device 140. Computing device 140 may be communicatively connected to electric aircraft 104 via a network 144. A "network", for the purpose of this disclosure, is any medium configured to facilitate communication between two or more devices. Network 144 may include any mesh network described in this disclosure, for example without limitation an avionic mesh network. For instance and without limitation, the avionic mesh network may be consistent with the avionic mesh network in U.S. patent application Ser. No. 17/348,916 and entitled "METHODS AND SYSTEMS FOR SIMULATED OPERATION OF AN ELECTRIC VERTICAL TAKE-OFF AND LANDING (EVTOL) AIRCRAFT," which is incorporated by reference herein in its entirety. In a non-limiting embodiment, network 144 may include a central mesh network and a plurality of local mesh networks. A "central mesh network," as used in this disclosure, is a mesh network used by a fleet of electric aircrafts, wherein each node of the central mesh network includes an entity that is associated with the fleet. Any mesh network may include a computing device such as computing device 140 to be configured to generate nodes to its mesh network. In a non-limiting embodiment, each node of a central mesh network may include any electric aircraft of the same fleet and any entity such as, but not limited to, a ground station associated with the fleet, a fleet manager of the fleet of electric aircrafts operating a remote device, and the like thereof. A "local mesh network," as used in this disclosure, is a mesh network created by the computing device of an electric aircraft of the fleet, wherein the electric aircraft is the central node of its local mesh network. In a non-limiting embodiment, each electric aircraft may be the central node if its respective local mesh network. This is so, at least in part, because an electric aircraft of the fleet may detect other entities not associated with the fleet such as, but not limited to, other aircrafts, an air traffic control authority, and the like thereof, that the central mesh network of the fleet may not be in range of detecting the other entities. A central mesh network and/or the local mesh network may include some security program such as authentication module 148 to authorize some level of communication between the electric aircraft and the other entities. In a non-limiting embodiment, a central mesh network may authenticate the other entities and generate additional nodes into the central mesh network temporarily. In another non-limiting embodiment, the central mesh network may merge with the plurality of local mesh networks. Alternatively or additionally, a central mesh network may be a merge of the plurality of local mesh networks. In some embodiments, the central mesh network may generate the additional nodes and integrate them into the central mesh network and delete those nodes. A central mesh network may only temporarily generate the additional nodes to allow for any data the central mesh network may have to be sent over to the other entities via the additional nodes. A central mesh network may then delete those nodes once communication is complete. A central mesh network may include a central node, which may be a ground station associated with the fleet and/or a fleet manager, wherein the range of the central mesh network originates from the position of the central node. Persons skilled in the art, upon reviewing the entirety of this disclosure, will be aware of various levels of access of nodes and data for purposes as described herein.

With continued reference to FIG. 1, computing device 140 may be configured to establish a communication link with electric aircraft 104. A "communication link," as used in this disclosure, is a transfer medium for data, communication, information, and the like thereof. Establishing a communication link may include electric aircraft 104 to connect to network 144, thereby connecting to computing device 140. A communication link may include any combination of elements suitable for establishing a communicative connection as described in this disclosure. In some embodiments, a communication link may be established either by electric aircraft 104 or computing device 140 via network 144. In a non-limiting embodiment, a communication link may include a radio channel, chatroom, secure signal ports, and the like thereof. A communication link may be established wirelessly prior to electric aircraft 104 landing on a charging station. A communication link may be established as a function charging connector 128 mating with electric aircraft port 132 or electric aircraft 104, such as a wire communication. Alternatively or additionally, a communication link may be established between electric aircraft 104 and charging connector 128 and/or computing device 140 as described in U.S. patent application Ser. No. 17/515,456. In some embodiments, a communication link may serve as a medium in which transfer of data, communication, and/or verification of data, is enabled. For example and without limitation, charging connector 128 and/or computing device 140 may receive authentication datum 120 and/or current aircraft datum 124 via an established communication link. In another non-limiting embodiment, electric aircraft 104 may receive an aircraft update datum 156 via the established communication link. Persons skilled in the art, upon reviewing the entirety of this disclosure, will be aware of the various embodiments and purposes for data communication.

In a non-limiting embodiment, and still referring to FIG. 1, a communication link may include a charge connection. A "charge connection," for the purposes of this disclosure, is any form of connection linking an electric charging and/or chargeable device with another electric charging and/or chargeable device. In a non-limiting embodiment, charge connection may include any means of connection such that the charging connector 128 and the electric aircraft 104 are in contact. In a non-limiting embodiment, charge connection may include a direct connection method of linkage. A "direct connection," for the purposes of this disclosure, refers to the physical connection between electric aircraft 104 and charging connector 128. For example and without limitation, direct connection may connect charging connector 128 of the electric aircraft 104 to a charging station. Direct connection may be done by linking electric aircraft 104 and charging connector 128 using, but not limited to, a physical connector, a plug a socket a male component, a female component, and the like thereof. Charge connection may include an indirect connection between electric aircraft 104 and charging connector 128. An "indirect connection," for the purposes of this disclosure, refers to an electronic connection between computing devices. Indirect connection may include an electronic connection between a computing device 140 and a charging connector 128. Indirect communication may include any signals, electronic signals, radio signals, transmission signals, and the like thereof. In a non-limiting embodiment, computing device 140 may be configured to form a charge connection and/or indirect connection with computing device 140.

With continued reference to FIG. 1, computing device 140 may be configured to verify authentication datum 120; this may be performed without limitation as a function of an authentication module 148. An "authentication module," for the purpose of this disclosure, is a hardware and/or software module configured to authenticate electric aircraft 104 and/or user associated with electric aircraft 104. In a non-limiting embodiment, authentication may be performed automatically via authentication module 148. In a non-limiting embodiment, authentication may be performed manually by an authoritative figure such as a fleet manager using a remote user device comprising computing device 140. A "fleet manager," for the purpose of this disclosure, is an authoritative figure configured to monitor, manage, and/or supervise the network communication of an electric aircraft fleet assigned to the fleet manager. A "remote user device," for the purpose of this disclosure, is a computing device that includes an interactive device and graphical user interface (GUI). A remote user device may be used to monitor and verify additional electric aircrafts connected to network 144. Alternatively or additionally, flight controller 116 of electric aircraft 104 may include an authentication module similar to authentication module 148. In a non-limiting embodiment, flight controller 116 may verify prior to establishing a communication link with computing device 140 and/or transferring any data using an authentication module.

In a non-limiting embodiment, and still referring to FIG. 1, computing device 140 may be configured to compare the credential of electric aircraft 104 and/or user of electric aircraft 104 to an authorized credential stored within an authentication database, and authenticate a user device, electric aircraft 104, and/or computing device 140 based on the comparison of the credential from user device to the authorized credential stored within the authentication database 152. The credential and identification related information may be found in authentication datum 120. In some embodiments, a user device of electric aircraft 136 may be configured to be authorized. A user device of electric aircraft 104 may be consistent with flight controller 116 of electric aircraft 104. A "credential" as described in the entirety of this disclosure, is any datum representing an identity, attribute, code, and/or characteristic specific to a user, a user device, and/or electric aircraft 104. For example and without limitation, the credential may include a username and password unique to the user, the user device, and/or the electric aircraft. The username and password may include any alpha-numeric character, letter case, and/or special character. As a further example and without limitation, the credential may include a digital certificate, such as a PKI certificate. The remote user device and/or the electric aircraft may include an additional computing device, such as a mobile device, laptop, desktop computer, or the like; as a non-limiting example, the user device may be a computer and/or smart phone operated by a pilot-in-training at an airport hangar. The remote user device and/or electric aircraft may include, without limitation, a display in communication with computing device 140. In a non-limiting embodiment, a remote user device may incorporate flight controller 116. In some embodiments, the display may include any display as described in the entirety of this disclosure such as a light emitting diode (LED) screen, liquid crystal display (LCD), organic LED, cathode ray tube (CRT), touch screen, or any combination thereof. Output data from computing device 140 may be configured to be displayed on user device using an output graphical user interface. An output graphical user interface may display any output as described in the entirety of this disclosure. As a further embodiment, authentication module 148 and/or computing device 140 may be configured to receive a credential from an admin device. An "admin device," as used in this disclosure, is a user device operated by an authoritative figure, such as, but not limited to, a fleet manager. In some embodiments, an admin device may be remotely located from electric aircraft 104 and/or located at a charging station. In another non-limiting embodiment, an admin device may include any additional computing device as described above in further detail, wherein the additional computing device is utilized by/associated with an employee of an administrative body, such as an employee of the federal aviation administration.

As used in this disclosure, "verification" is a process of ensuring that which is being "verified" complies with certain constraints, for example without limitation assembly requirements, regulations, and the like. In some cases, verification may include comparing a product, such as without limitation, authentication datum 120 including an identity of a user, user device, and/or pilot datum, against one or more acceptance criteria. In some cases, the information of electric aircraft 104 such as current aircraft datum 124 may also be required to be verified. Ensuring that electric aircraft 104 and its information is in compliance with acceptance criteria may, in some cases, constitute verification. In some cases, verification may include ensuring that data is complete, for example that all required data types, are present, readable, uncorrupted, and/or otherwise useful for computing device 140. In some cases, some or all verification processes may be performed by computing device 140. In some cases, at least a machine-learning process, for example a machine-learning model, may be used to verify. Computing device 140 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

As used in this disclosure, "validation" is a process of ensuring that which is being "validated" complies with authoritative figures, including fleet managers, air traffic control (ATC) operators, federal aviation administration, and the like thereof. Very often a specification prescribes certain testable conditions (e.g., metrics) that codify relevant authoritative figure's expectations and/or desires. In some cases, validation includes comparing a product, for example without limitation authentication datum 120 and/or current aircraft datum 124, against a specification. In some cases, computing device 140 may be additionally configured to validate a product by validating constituent sub-products. In some embodiments, computing device 140 may be configured to validate any product or data, for example without limitation authentication datum 120 and/or current aircraft datum 124. In some cases, at least a machine-learning process, for example a machine-learning model, may be used to validate by computing device 140. Computing device 140 may use any machine-learning process described in this disclosure for this or any other function.

For example and without limitation, and still referring to FIG. 1, verification may include confirming the identity of electric aircraft 104 and/or user of electric aircraft 104 wherein the identity is stored in authentication database 152. In another non-limiting example, verification may include verifying that current aircraft datum 124 such as the itinerary, flight plan, operation schedule, and the like thereof, of electric aircraft 104 is verified by comparing it to information stored in aircraft datum database 172. In a non-limiting embodiment, computing device 140 may generate an aircraft identity machine-learning model. An "aircraft identity machine-learning model," as used in this disclosure, is any machine-learning model, process, and/or algorithm configured to identify the identity of an electric aircraft such as electric aircraft 104. Identifying may include verifying the identity of a user of an electric aircraft such as a pilot. An aircraft identity machine-learning model may receive an authentication datum 120 from electric aircraft 104 as an input. Computing device 140 may then train the aircraft identify identity machine-learning model using an aircraft identity training set. An "aircraft identity training set," as used in this disclosure, is a training set including a unique identifier of electric aircraft 104 correlated to an identification of electric aircraft 104. An aircraft identity training set may be retrieved from authentication database 152. A "unique identifier," as used in this disclosure, may include a value, text, input, user, code, and the like thereof, associated with electric aircraft 104. In some embodiments, a unique identifier may include a designated pilot and/or fleet manager of electric aircraft 104. In some embodiments, a unique identifier may include a digital certificate, cryptographic hash, a public and/or private key, and the like thereof, associated with electric aircraft 104 and/or user of electric aircraft 104. An "identification" of electric aircraft 104 may include a successful authentication of 104, an unsuccessful authentication of 104, an alert denoting an unrecognized aircraft and/or pilot, and the like thereof. Computing device 140 may then output a verification receipt of 104 which may be incorporated into aircraft update datum 156. A "Verification receipt," as used in this disclosure, is a receipt confirming authentication datum 120 of electric aircraft 104 and/or digital signature denoting an authorization of electric aircraft 104. In some embodiments a verification receipt may enable charging connector 128 to provide charging to electric aircraft 104 and/or transferring of aircraft update datum 156 to electric aircraft 104.

In another non-limiting example, and still referring to FIG. 1, computing device 140 may generate an aircraft datum machine-learning model. An "aircraft datum machine-learning model," as used in this disclosure, is any machine-learning model process, and/or algorithm configured to generate 156 and/or confirm current aircraft datum 124 is up to date. An aircraft datum machine-learning model may receive current aircraft datum 124 as an input. Computing device 140 may train the aircraft datum machine-learning model using an aircraft datum training set. An "aircraft datum training set," as used in this disclosure, is a training set including a current aircraft flight datum correlated to a last aircraft flight datum. A "current aircraft flight datum," as used in this disclosure, is an element of current aircraft datum 124 used to match electric aircraft 104 to a data storage comprising an entirety of flight information associated with electric aircraft 104, including past, current, and future flight plans, schedules, timelines, operations, etc. A "last aircraft flight datum," as used in this disclosure, is an element of aircraft update datum denoting the most recent and/or last addition to aircraft datum database 172 associated with electric aircraft 104 and its flight information. In some embodiments, new changes may have been made to the itinerary and/or flight plan of electric aircraft 104 in which those information may be incorporated into aircraft update datum 156. In some embodiments, an aircraft datum of electric aircraft 104 may include a listing of updates, associated with electric aircraft 104, in which aircraft update datum 156 may be added into the listing of aircraft datum for electric aircraft 104. The aircraft datum machine-learning model may output aircraft update datum 156 as a function of the aircraft datum training set. Persons skilled in the art, upon reviewing the entirety of this disclosure, will be aware of the various embodiments of machine-learning and data verification, combination, correlation, and the like thereof, for purposes as described herein.

With continued reference to FIG. 1, computing device 140 may be configured to transmit an aircraft update datum 156 to electric aircraft 104 as a function of the verification of electric aircraft 104 and/or its information. An "aircraft update datum," as used in this disclosure, is a an element of data, software, and/or firmware that is not currently installed and/or stored on electric aircraft 104 and/or that represents a newer version of data, software, and/or firmware stored on the electric aircraft 104. In some embodiments, aircraft update datum 156 may be identical to current aircraft datum 124. For example and without limitation, computing device 140 may compare the contents of current aircraft datum 124 to the contents of aircraft datum database 172, wherein aircraft datum database 172 stores all flight information associated with electric aircraft 104. In some embodiments, aircraft datum database 172 may store the most recent and/or accurate flight information associated with an electric aircraft. For example and without limitation, updates to an electric aircraft's flight plan, itinerary, schedule, timeline, and the like thereof, may be made while the electric aircraft is already in midflight and/or the electric aircraft is not reachable for communication. In some embodiments, a computing device may be configured to update aircraft datum database 172 by transmitting a bitstream to update an FPGA, updates to machine-learning parameters, coefficients, weights, and/or biases, updates to navigation parameters, updates to flight plan, updates to operation schedules, and the like thereof. Alternatively or additionally, these could be any update to any element of software, firmware, and/or data used by a flight controller as described in further detail below. These updates may be linked together in an immutable sequential listing representing an aircraft datum for an electric aircraft.

Still referring to FIG. 1, aircraft update datum 156 may include a confirmation receipt 160. A "confirmation receipt," as used in this disclosure, is an acknowledgement of an electric aircraft's current aircraft datum 124. In a non-limiting embodiment, confirmation receipt 160 may include a digital signature and/or digital certificate denoting computing device 140 and/or charging connector 128 has received, acknowledged, and/or verified current aircraft datum 124. In some embodiments, confirmation receipt 156 may be generated by authentication module 148. In another non-limiting embodiment, computing device 140 and/or charging connector 128 may receive current aircraft datum 124, check if current aircraft datum 124 is up to date, and generate confirmation receipt 160. Confirmation receipt 160 may be incorporated into aircraft update datum 156 which is to be transmitted to electric aircraft 104 through a communication from charging connector 128 and/or computing device 140. In a non-limiting embodiment, checking current aircraft datum 124 may include comparing current aircraft datum 124 to the last entry of an aircraft datum associated with electric aircraft 104 retrieved from aircraft datum database 172. In another non-limiting embodiment, checking current aircraft datum 124 may include using an aircraft datum machine-learning model as described above. In some embodiments, confirmation receipt 160 may be generated as a function of current aircraft datum 124 being identical to aircraft update datum 156. For example and without limitation, aircraft update datum 156 for electric aircraft 104 may include the last entry of aircraft datum associated with electric aircraft 104. If the last entry is identical to current aircraft datum 124, electric aircraft 104 is already fitted with the most recent and accurate information, in which confirmation receipt 160 acknowledging that would be transmitted to electric aircraft 104 along with aircraft update datum 156. Persons skilled in the art, upon reviewing the entirety of this disclosure, will be aware of the various embodiments of transfer of data in the context of comparing information.

With continued reference to FIG. 1, aircraft update datum 156 may include a flight plan update 164. A "flight plan update," as used in this disclosure, is a flight plan information associated with electric aircraft 104 that is the most recent and/or last entry of flight plan information for electric aircraft 104. For example and without limitation, electric aircraft 104 and its current aircraft datum 124 may include a flight plan to make a direct flight to a location. In a non-limiting embodiment, flight plan update 164 may include an updated flight plan compared to what was in current aircraft datum 124, such as making a layover at a secondary location. In some embodiments, flight plan update 164 may be retrieved form aircraft datum database 172. Persons skilled in the art, upon reviewing the entirety of this disclosure, will be aware of the various embodiments of changes to an electric aircraft's itinerary in the context of communication of information.

Still referring to FIG. 1, aircraft update datum 156 may include a recharging appointment datum 168. A "recharging appointment datum," as used in this disclosure, is a collection of information describing a timeline and/or schedule for recharge of electric aircraft 104. In a non-limiting embodiment, recharging appointment datum 168 may include a history and/or record of all previous recharging appointments that electric aircraft 104 has undertaken. A "recharging appointment," as used in this disclosure, is any instance that an electric aircraft has received recharge of its energy source. Recharging appointment datum 168 may include information describing future time, location, and/or type of charging that electric aircraft 104 would be assigned to. This is so, at least in part, to ensure electric aircraft 104 has ample energy to fulfill its operations, maintain consistent tracking of electric aircraft 104 and its recharge allocation, and the like thereof. Persons skilled in the art, upon reviewing the entirety of this disclosure, will be aware of the various embodiments of appointments and schedules assigned to an electric aircraft in the context of recharging.

In a non-limiting embodiment, and still referring to FIG. 1, computing device 140 may be configured to generate a recharge command 176. A "recharge command," as used in this disclosure, is an instruction to provide a specific charge to electric aircraft 104 for recharging purposes. In a non-limiting embodiment, recharge command 176 may include charging energy source 108 of electric aircraft 104 to a specific recharge amount. The recharge amount may be enough to recharge energy source 108 to full capacity. In another embodiment, the recharge amount may not fully recharge energy source 108 of electric aircraft 104 and instead only recharge it up to 70% so electric aircraft 104 will have ample energy to arrive at its next destination denoted by aircraft update datum 156. In some embodiments, the next destination may include another charging station as denoted by flight plan update 164 and/or recharging appointment datum 168. Persons skilled in the art, upon reviewing the entirety of this disclosure, will be aware of the various embodiments of recharging for an electric aircraft.

Figure 2:
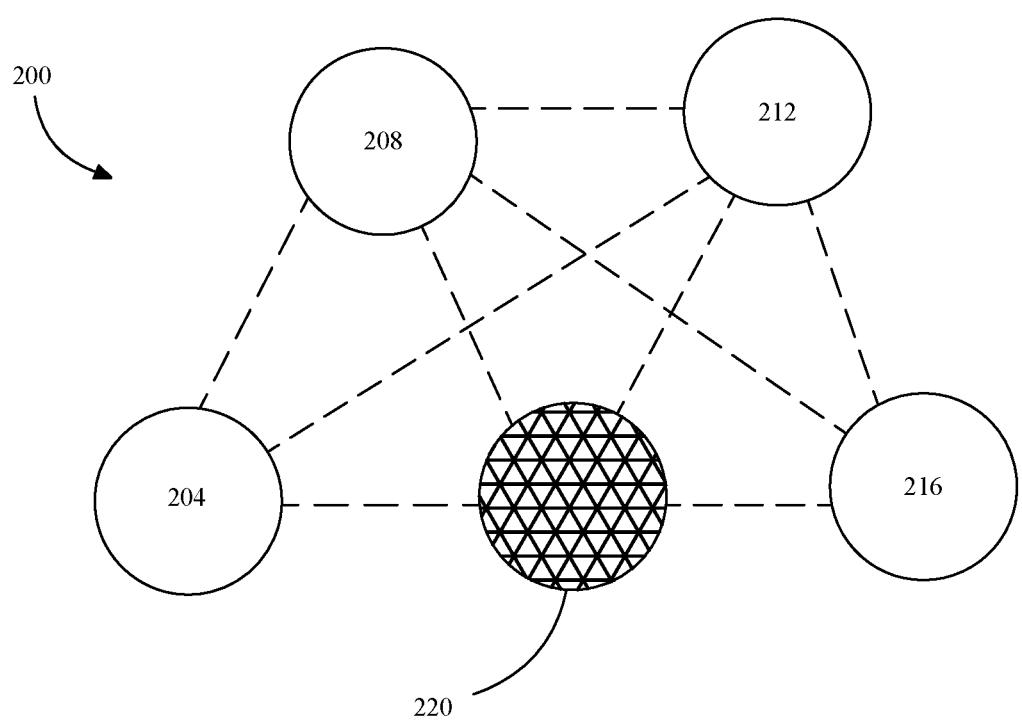
FIG. 2 is a block diagram of an exemplary embodiment of a mesh network for an aircraft.

Now referring to FIG. 2, a system 200 for a network is illustrated. The network may be consistent with network 144 as described in FIG. 1. In some embodiments, assembly 200 may include nodes 204, 208, 212, and 216. For instance and without limitation, the network may be consistent with the mesh network in U.S. patent application Ser. No. 17/478,067 and entitled, "ASSEMBLY FOR A MESH NETWORK FOR USE IN AIRCRAFTS," which is incorporated by reference herein in its entirety. In a non-limiting embodiment, each node may represent an electric aircraft such as electric aircraft 104, charging station, and/or charging connector 128. Assembly 200 shows inactive node 220. Inactive node 220 may include a physically damaged node generating component, data corrupted node, and/or powered down node. In a non-limiting example, node 204 may be configured to transmit data to inactive node 220. Inactive node 220 may be configured to relay data from node 204 to node 216. Node 204 may be configured to communicate with another node to relay data to node 216 in the case that inactive node 220 may not be functioning. In some embodiments, node 204 may be configured to relay data to node 208. Node 208 may be configured to relay data from node 204 to node 216. In some embodiments, node 204 may be configured to transmit data to node 212. Node 212 may be configured to relay data from node 204 to node 216. Any node of assembly 200 may be configured to relay data from one node to another through an alternate pathway in an event a node may be inactive. In some embodiments, nodes of assembly 200 may be configured to choose a data transmission pathway from one node to another node. A "data transmission pathway" as used in this disclosure is a selection of communication from one node to one or more other nodes. In some embodiments, a data transmission pathway may be calculated based on, but not limited to, signal strength, node distance, number of nodes, node traffic, inactive nodes, active nodes, and the like. In a non-limiting example, node 204 may transmit data to node 216 through node 212. Node 212 may have a slow response time communicating data to node 204. Node 204 may detect a slow response time of node 212 and update a pathway of transmission by communicating data to node 208 which may relay data to node 216. In some embodiments, assembly 200 may utilize a machine learning model to predict optimal data transmission pathways of nodes. A machine learning model may input a plurality of node connections and output an optimal data transmission pathway between nodes. In some embodiments, a machine learning model may be trained on training data correlating node connections to an optimal data transmission pathway. Assembly 200 may utilize a machine learning model to update connections between nodes that may assist in transmission speed, data security, and the like.

Figure 3:
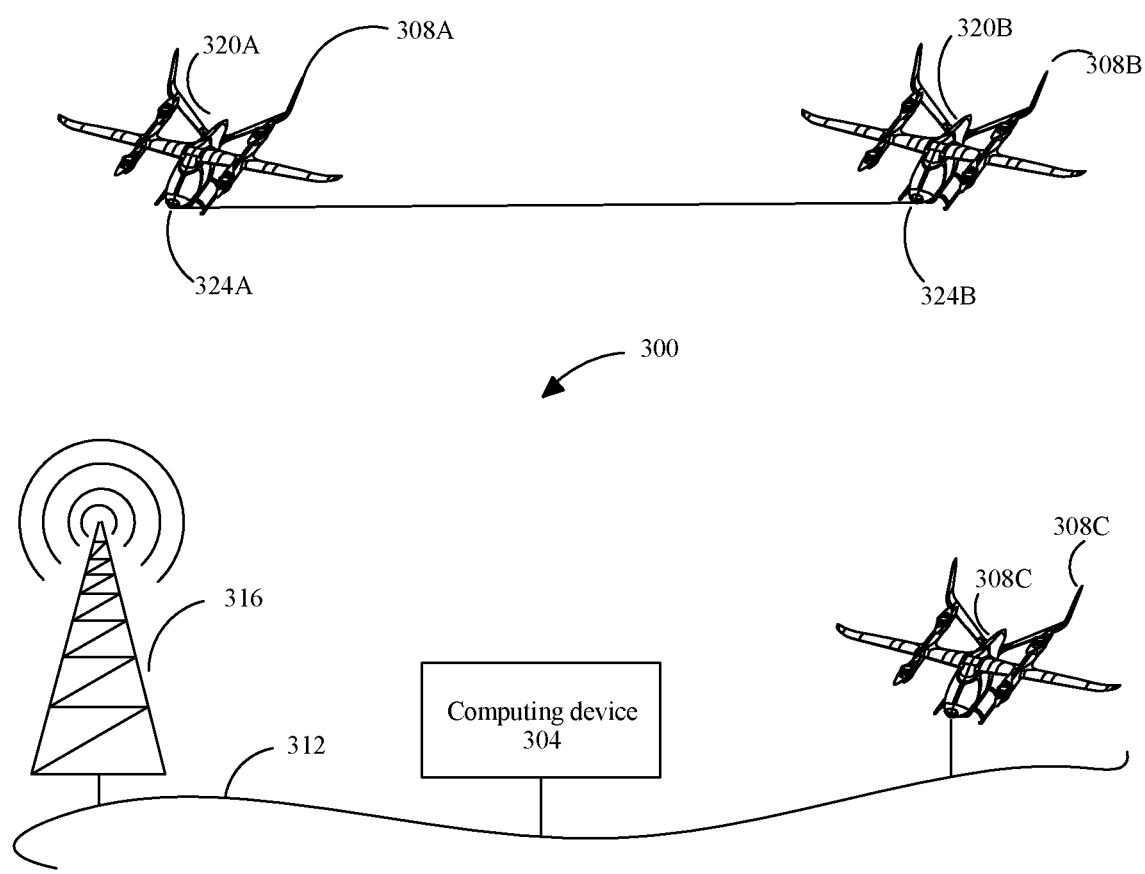
FIG. 3 is an illustration of an exemplary embodiment of an avionic mesh network.

Referring to FIG. 3, an avionic mesh network 300 is schematically illustrated. According to some embodiments, an avionic mesh network may include a single network. Alternatively or additionally, an avionic mesh network may include more than a single network. A single network may be differentiated according to address, for example Internet Protocol address, gateway, or name server used. For example, in some cases, multiple networks may use different gateways, even though the multiple networks may still be within communicative connection with one another.

With continued reference to FIG. 3, in some embodiments, an avionic mesh network 300 may include inter-aircraft network nodes, intra-aircraft network nodes, as well as non-aircraft network nodes. As used in this disclosure, a "network node" is any component communicatively coupled to at least a network. For example, a network node may include an endpoint, for example a computing device on network, a switch, a router, a bridge, and the like. A network node may include a redistribution point, for example a switch, or an endpoint, for example a component communicatively connected to network. As used in this disclosure, "inter-aircraft network nodes" are two or more network nodes that are physically located in two or more aircraft and communicatively connected by way of an inter-aircraft network. As used in this disclosure, "intra-aircraft network nodes" are two or more intra-aircraft network nodes that are each physically located within a single aircraft and communicatively connected. As used in this disclosure, a "non-aircraft network node" is a network node that is not located on an aircraft and is communicatively connected to a network.

With continued reference to FIG. 3, in some embodiments, avionic mesh network 300 may include a wireless mesh network organized in a mesh topology. A mesh topology may include a networked infrastructure in which network nodes may be connected directly, dynamically, and/or non-hierarchically to many other nodes (e.g., as many other nodes as possible). In some cases, a mesh topology may facilitate cooperation between network nodes, for example redistributive network nodes, in routing of communication between network participants (e.g., other network nodes). A mesh topology may facilitate a lack of dependency on any given node, thereby allowing other nodes to participate in relaying communication. In some cases, mesh networks may dynamically self-organize and self-configure. Self-configuration enables dynamic distribution of workloads, particularly in event a network node failure, thereby contributing to fault-tolerance and reduced maintenance requirements. In some embodiments, mesh networks can relay messages using either a flooding technique or a routing technique. A flooding technique sends a message to every network node, flooding network with the message. A routing technique allows a mesh network to communicate a message is propagated along a determined nodal path to the message's intended destination. Message routing may be performed by mesh networks in part by ensuring that all nodal paths are available. Nodal path availability may be ensured by maintaining continuous nodal network connections and reconfiguring nodal paths with an occurrence of broken nodal paths. Reconfiguration of nodal paths, in some cases, may be performed by utilizing self-healing algorithms, such as without limitation Shortest Path Bridging. Self-healing allows a routing-based network to operate when a node fails or when a connection becomes unreliable. In some embodiments, a mesh network having all network nodes connected to each other may be termed a fully connected network. Fully connected wired networks have advantages of security and reliability. For example, an unreliable wired connection between two wired network nodes will only affect only two nodes attached to the unreliable wired connection.

With continued reference to FIG. 3, an exemplary avionic mesh network 300 is shown providing communicative connection between a computing device 304 and aircraft 308A-C. Computing device 304 may include any computing device described in this disclosure. In some embodiments, computing device 304 may be connected to a terrestrial network 312. Terrestrial networks 312 may include any network described in this disclosure and may include, without limitation, wireless networks, local area networks (LANs), wide area networks (WANs), ethernet, Internet, mobile broadband, fiber optic communication, and the like. In some cases, a grounded aircraft 308C may be connected to an avionic mesh network 300 by way of a terrestrial network 312. In some cases, avionic mesh network 300 may include a wireless communication node 316. A wireless communication node 316 may provide communicative connection by way of wireless networking. Wireless networking may include any wireless network method described in this disclosure, including without limitation Wi-Fi, mobile broadband, optical communication, radio communication, and the like. In some cases, wireless communication node 316 may be configured to connect with a first airborne aircraft in flight 308A. First airborne aircraft in some embodiments may include at least a first intra-aircraft network node 320A. As described above, first intra-aircraft network node 320A may be configured to connect to other nodes within first airborne aircraft 308A. In some cases, avionic mesh network 300 may be configured to provide inter-aircraft communication, for instance by using a first inter-aircraft network node 324A. In some cases, first inter-aircraft network node may be configured to communicate with a second inter-aircraft network node 324B. Inter-aircraft nodes 320A-B may include radio communication and/or optical wireless communication, for example free space optical communication.

With continued reference to FIG. 3, avionic mesh network 300 may be additionally configured to provide for encrypted and/or secured communication between components, i.e., nodes, communicative on the network. In some cases, encrypted communication on network 300 may be provided for by way of end-to-end encryption. Exemplary non-limited end-to-end encryption methods include symmetric key encryption, asymmetric key encryption, public key encryption methods, private key encryption methods and the like. In some cases, avionic mesh network 300 and/or another network may be configured to provide secure key exchange for encryption methods. Exemplary non-limiting key exchange methods include Diffie-Hellman key exchange, Supersingular isogeny key exchange, use of at least a trusted key authority, password authenticated key agreement, forward secrecy, quantum key exchange, and the like. In some cases, an avionic mesh network 300 may include at least an optical network component, for example fiber optic cables, wireless optical networks, and/or free space optical network. In some cases, encrypted communication between network nodes may be implemented by way of optical network components. For example, quantum key exchange in some embodiments, may defeat man-in-the-middle attacks. This is generally because, observation of a quantum assembly disturbs the quantum assembly. Quantum key exchange in some cases, uses this general characteristic of quantum physics to communicate sensitive information, such as an encryption key, by encoding the sensitive information in polarization state of quantum of radiation. At least a polarization sensitive detector may be used to decode sensitive information.

Figure 4:
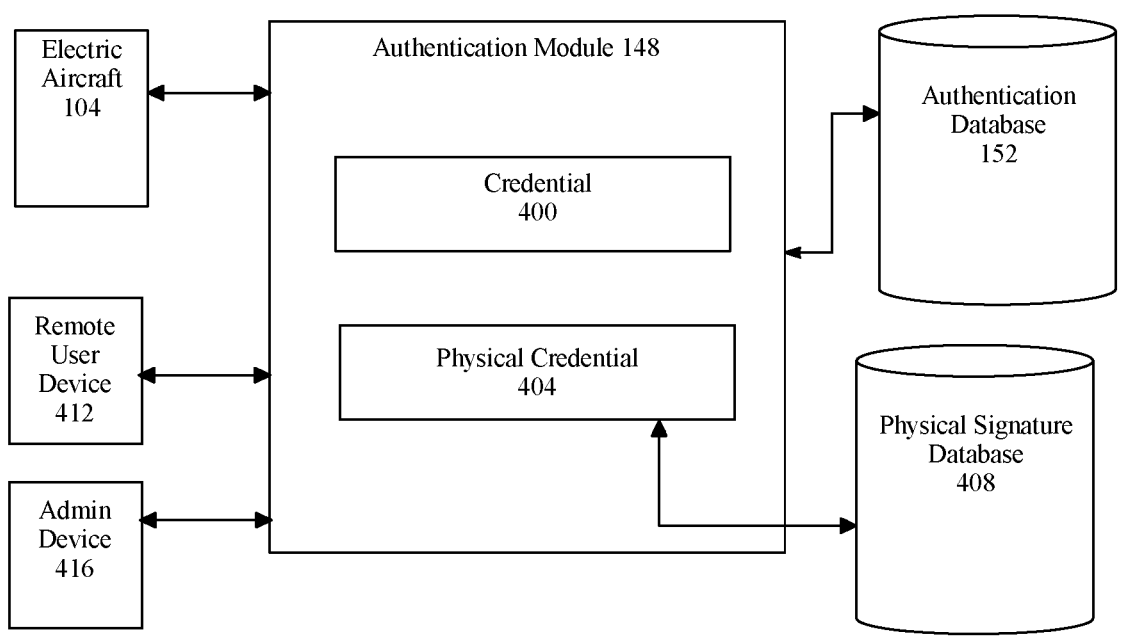
FIG. 4 is a block diagram of an exemplary embodiment of an authentication module.

Referring now to FIG. 4, an embodiment of authentication module 148, as pictured in FIG. 1, is illustrated in detail. Authentication module 148 may include any suitable hardware and/or software module. Authentication module 148 and/or computing device 140 can be configured to authenticate electric aircraft 104 and or any electric aircraft 104 of the electric aircraft fleet. Authenticating, for example and without limitation, can include determining an electric vehicle's ability/authorization to access information included in each module and/or engine of the plurality of modules and/or engines operating on computing device 140. As a further example and without limitation, authentication may include determining an instructor's authorization/ability of access to the information included in each module and/or engine of the plurality of modules and/or engines operating on computing device 140. As a further non-limiting example, authentication may include determining an administrator's authorization and/or ability to access the information included in each module and/or engine of the plurality of modules and/or engines operating on computing device 140. Authentication may enable access to an individual module and/or engine, a combination of modules and/or engines, and/or all the modules and/or engines operating on computing device 140. In a non-limiting embodiment, authentication module 148 may be configured to receive credential 400 from electric aircraft 104. Credential 400 may include any credential as described above in further detail in reference to FIG. 1. For example and without limitation, credential 400 may include a username and password unique to the user and/or electric aircraft 104. As a further example and without limitation, credential 400 may include a PKI certificate unique to the user and/or electric aircraft 104. As a further embodiment, credential 400 may be received from remote user device 412 and/or admin device 416, such that credential 400 would authenticate an admin device 416, respectively. An "remote user device," for the purpose of this disclosure, is a user device used by remotely located operation. In some embodiments, remote user device 412 may be consistent with flight controller 116 of electric aircraft 104 in the event electric aircraft 104 desires to authenticate a credential of a charging station and/or charging connector 128. An "admin device," as used in this disclosure, is a device operated by an administrative and/or authoritative figure such as a fleet manager of electric aircraft 104, air traffic control operator, and/or operator of a charging station and/or charging connector 128. In a non-limiting embodiment, a fleet manager may communicate with each electric aircraft of the fleet of electric aircraft 104 via remote user device 412.

Continuing to refer to FIG. 4, authentication module 148 and/or computing device 140 may be further designed and configured to compare credential 400 from electric aircraft 104 to an authorized credential stored in authentication database 152. For example, authentication module 148 and/or computing device 140 may be configured to compare credential 400 from electric aircraft 104 to a stored authorized credential to determine if credential 400 matches the stored authorized credential. As a further embodiment, authentication module 148 and/or computing device may compare credential 400 from remote user device 412 to an authorized credential stored in authentication database 152. For example, authentication module 148 and/or computing device may be configured to compare credential 400 from remote user device 412 to a stored authorized credential to determine if credential 400 matches the stored authorized credential. As a further non-limiting example, authentication module 148 and/or computing device 140 may match credential 400 from admin device 416 to an authorized credential stored in authentication database 152. For example, authentication module 148 and/or computing device may be configured to compare credential 400 from admin device 416 to a stored authorized credential to determine if credential 400 matches the stored authorized credential. In embodiments, comparing credential 400 to an authorized credential stored in authentication database 152 can include identifying an authorized credential stored in authentication database 152 by matching credential 400 to at least one authorized credential stored in authentication database 152. Authentication module 148 and/or computing device 140 may include or communicate with authentication database 152. Authentication database 152 may be implemented as any database and/or datastore suitable for use as authentication database 152 as described in the entirety of this disclosure. The "authorized credential" as described in the entirety of this disclosure, is the unique identifier that will successfully authorize each pilot and/or electric aircraft 104 if received. For example and without limitation, the authorized credential is the correct alpha-numeric spelling, letter case, and special characters of the username and password for electric aircraft 104. Persons skilled in the art, upon reviewing the entirety of this disclosure, will be aware of various examples of authorized credentials that may be stored in the authentication database consistently with this disclosure.

Still referring to FIG. 4, authentication module 148 and/or computing device 140 is further designed and configured to authenticate for electric aircraft 104 based on the identification of the authorized credential stored within authentication database 152. In some embodiments, the credential stored within authentication database 152 may include authentication datum 120. In a non-limiting embodiment, authenticating may include permitting access to electric aircraft 104, user of electric aircraft 104, and/or flight controller 116 to access the information included in each module and/or engine of the plurality of modules and/or engines operating on computing device 140. Authenticating may enable access to an individual module and/or engine, a combination of modules and/or engines, and/or all the modules and/or engines operating on computing device 140, as described in further detail in the entirety of this disclosure. As a further example and without limitation, authenticating may include authenticating for remote user device 412 based on the comparison of the authorized credential stored in authentication database 152. As a further non-limiting example, authenticating may include authenticating for admin device 416 based on the comparison of the authorized credential stored in authentication database 140.

With continued reference to FIG. 4, authentication module 148 and/or computing device 140 may be further configured to authenticate electric aircraft 104 as a function of a physical signature authentication. A "physical signature authentication," for the purpose of this disclosure, is an authentication process that determines an electric vehicle's ability to access the information included in each module and/or engine of the plurality of modules and/or engines operating on computing device 140 as a function of a physical signature credential 408. In a non-limiting embodiment, physical signature authentication, in the embodiment, includes receiving physical signature credential 408 from electric aircraft 104, comparing and/or matching physical signature credential 408 from electric aircraft 104 to an authorized physical signature credential stored in a physical signature database 408, and authenticating for electric aircraft 104 based on the comparison of the authorized physical signature credential stored within physical signature database 408. Physical signature authentication employing authentication module 148 may also include authenticating remote user device 412 and/or admin device 416. Authentication module 148 and/or computing device 140 may include or communicate with physical signature database 408. Physical signature database 408 may be implemented as any database and/or datastore suitable for use as a physical signature database entirely with this disclosure. An exemplary embodiment of physical signature database 408 is provided below in reference to FIG. 4. The "physical signature credential" as used in this disclosure, is any physical identifier, measurement, and/or calculation utilized for identification purposes regarding an electric vehicle and/or its pilot. In a non-limiting embodiment, physical signature credential 408 may include, but not limited to, a physiological characteristic and/or behavioral characteristic of the pilot associated with the electric vehicle. For example and without limitation, physical signature credential 408 may include vehicle model number, vehicle model type, vehicle battery type, vehicle authority level, pilot authority level, and the like thereof. The "authorized physical signature credential" as described in the entirety of this disclosure, is unique physical signature identifier that will successfully authorize each user and/or electric aircraft 104, such that the authorized physical signature credential is the correct physical signature credential which will enable the user and/or electric aircraft 104 access to the plurality of modules and/or engines operating on computing device 140. Persons skilled in the art, upon reviewing the entirety of this disclosure, will be aware of various examples of physical signature credentials and authorized physical signature credentials that may be utilized by authentication module 148 consistently with this disclosure.

Figure 5:
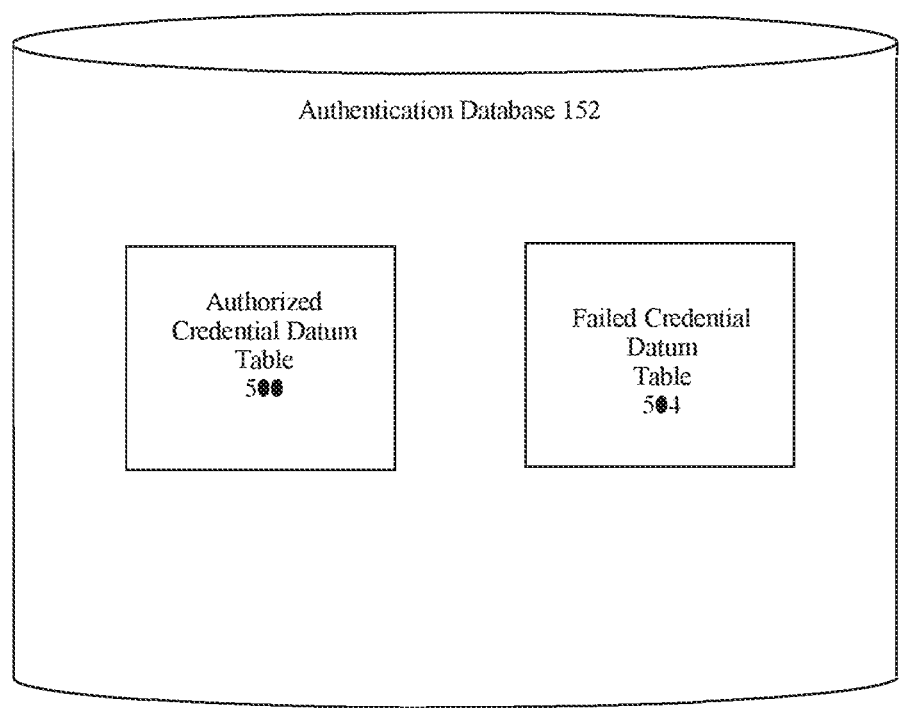
FIG. 5 is a block diagram illustrating an exemplary embodiment of an authentication database.

Referring now to FIG. 5, an embodiment of authentication database 152 is illustrated. Authentication database 152 may include any data structure for ordered storage and retrieval of data, which may be implemented as a hardware or software module. Authentication database 152 may be implemented, without limitation, as a relational database, a key-value retrieval datastore such as a NOSQL database, or any other format or structure for use as a datastore that a person skilled in the art would recognize as suitable upon review of the entirety of this disclosure. Authorization database 504 may include a plurality of data entries and/or records corresponding to credentials as described above. Data entries and/or records may describe, without limitation, data concerning authorized credential datum and failed credential datum.

With continued reference to FIG. 5, one or more database tables in authentication database 152 may include as a non-limiting example an authorized credential datum table 500. Authorized credential datum table 500 may be a table storing authorized credentials, wherein the authorized credentials may be for electric aircraft 104, remote user device, as described in further detail in the entirety of this disclosure. For instance, and without limitation, authentication database 152 may include an authorized credential datum table 500 listing unique identifiers stored for electric aircraft 104, wherein the authorized credential is compared/matched to a credential 500 received from electric aircraft 104.

Still referring to FIG. 5, one or more database tables in authentication database 152 may include, as a non-limiting example, failed credential datum table 504. A "failed credential", as described in the entirety of this disclosure, is a credential received from a device that did not match an authorized credential stored within authorized credential datum table 500 of authentication database 152. Such credentials can be received from electric aircraft 104, remote user device 512. Failed credential datum table 504 may be a table storing and/or matching failed credentials. For instance and without limitation, authentication database 152 may include failed credential datum table 504 listing incorrect unique identifiers received by a device in authentication module 168, wherein authentication of the device did not result. Tables presented above are presented for exemplary purposes only; persons skilled in the art will be aware of various ways in which data may be organized in authentication database 152 consistently with this disclosure.

Figure 6:
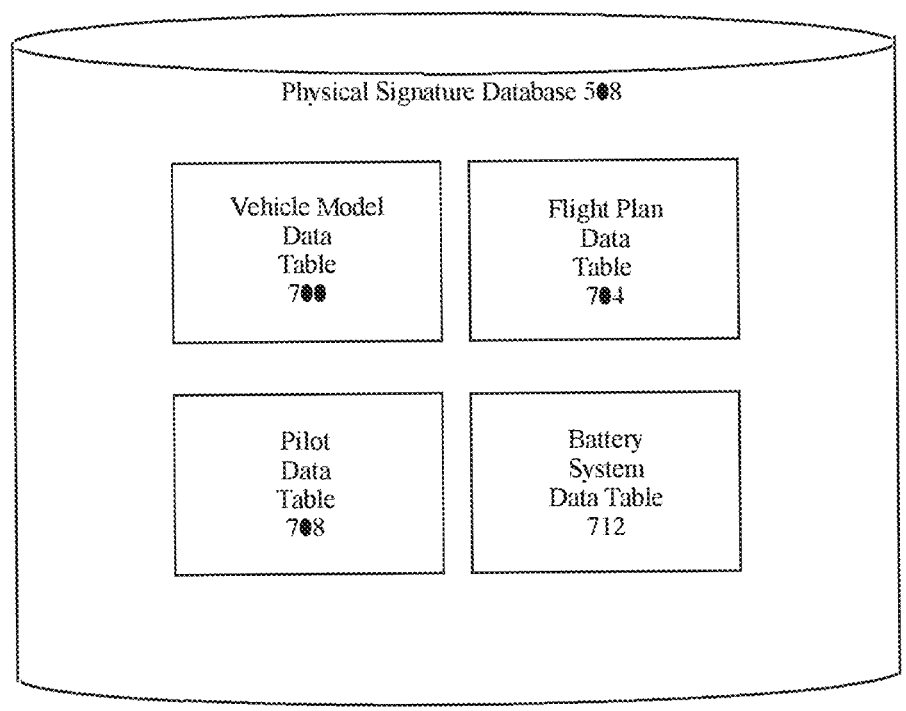
FIG. 6 is a block diagram illustrating an exemplary embodiment of a physical signature database.

Referring now to FIG. 6, an embodiment of physical signature database 408 is illustrated. Physical signature database 408 may include any data structure for ordered storage and retrieval of data, which may be implemented as a hardware or software module. Physical signature database 408 may be implemented, without limitation, as a relational database, a key-value retrieval datastore such as a NOSQL database, or any other format or structure for use as a datastore that a person skilled in the art would recognize as suitable upon review of the entirety of this disclosure. Physical signature database 408 may include a plurality of data entries and/or records corresponding to elements of physical signature datum as described above. Data entries and/or records may describe, without limitation, data concerning particular physiological characteristics and/or behavioral characteristics that have been collected. Data entries in a physical signature database 408 may be flagged with or linked to one or more additional elements of information, which may be reflected in data entry cells and/or in linked tables such as tables related by one or more indices in a relational database; one or more additional elements of information may include data associating a physical signature with one or more cohorts, including demographic groupings such as ethnicity, sex, age, income, geographical region, or the like. Additional elements of information may include one or more categories of physical signature datum as described above. Persons skilled in the art, upon reviewing the entirety of this disclosure, will be aware of various ways in which data entries in a physical signature database 408 may reflect categories, cohorts, and/or populations of data consistently with this disclosure.

Still referring to FIG. 6, one or more database tables in physical signature database 408 may include, as a non-limiting example, vehicle model data table 600. Vehicle model data table 600 may be a table correlating, relating, and/or matching physical signature credentials received from a device, such as electric aircraft 104 and/or remote user device 412 as described above, to fingerprint data. For instance, and without limitation, physical signature database 408 may include a vehicle model data table 600 listing samples acquired from an electric vehicle having allowed assembly 100 to retrieve data describing the make and model of the electric vehicle. The data may be retrieved by any identifier scanner that is configured to scan the shape, size, and/or any digital signature incorporated onto the electric vehicle. In a non-limiting embodiment, the electric vehicle itself may transmit the model data itself. Such data may be inserted in vehicle model data table 600.

With continued reference to FIG. 6, physical signature database 408 may include tables listing one or more samples according to a sample source. As another non-limiting example, physical signature database 408 may include flight plan data table 604, which may list samples acquired from an electric vehicle associated with electric aircraft 104 that has allowed assembly 100 to obtain information such as a flight plan of the electric vehicle, destination, cruising speed, and/or the like. For instance, and without limitation, physical signature database 408 may include pilot data table 608 listing samples acquired from an electric vehicle by obtaining the information regarding the pilot such as, pilot experience level, pilot authority level, pilot seniority level, and the like thereof. As a further non-limiting example, physical signature database 408 may include a battery assembly data table 612, which may list samples acquired from an electric vehicle associated with electric aircraft 104 that has allowed assembly 100 to retrieve the battery pack datum of electric aircraft 104 and/or the like. Tables presented above are presented for exemplary purposes only; persons skilled in the art will be aware of various ways in which data may be organized in physical signature database 408 consistently with this disclosure.

Figure 7:
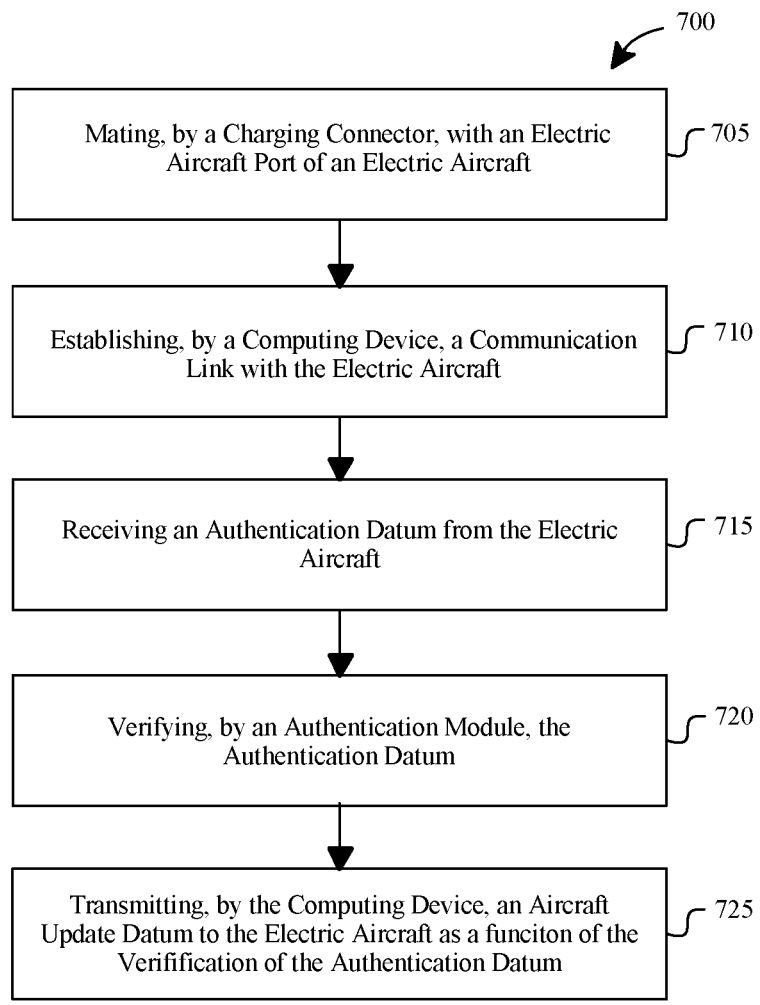
FIG. 7 is a flow diagram of an exemplary embodiment of a method for authenticated communication of data during recharge of an electric aircraft.

Now referring to FIG. 7, a flow diagram of a method 700 for authenticated communication of data during recharge of an electric aircraft is illustrated. Method 700, at step 705, may include mating, by a charging connector, with an electric aircraft port of the electric aircraft. The electric aircraft may include any electric aircraft as described herein. In some embodiments, method 700 may be used for authenticated communication of data during recharge of any electric vehicle. The charging connector may be consistent with any charging connector as described in the entirety of this disclosure. The electric aircraft port may include any electric aircraft port as described herein. Persons skilled in the art, upon reviewing the entirety of this disclosure, will be aware of the various methods of attaching a connector to an electric vehicle in the context of transferring materials.

Still referring to FIG. 7, method 700, at step 710, may include establishing, by a computing device, a communication link with the electric aircraft. The computing device may be consistent with any computing device as described in the entirety of this disclosure. The computing device may include a flight controller disposed on an electric aircraft. The communication link may include any communication link as described herein. In a non-limiting embodiment, method 700 may include establishing a communication link prior to the mating of a charging connector and an electric aircraft. In some embodiments, method 700 may include establishing a communication link as a function of a physical mating of a charging connector and an electric aircraft. Persons skilled in the art, upon reviewing the entirety of this disclosure, will be aware of the various methods of establishing a link in the context of secure transfer.

Still referring to FIG. 7, method 700, at step 715, may include receiving an authentication datum from the electric aircraft. The authentication datum may include any authentication datum as described herein. In a non-limiting embodiment, method 700 may include receiving a current aircraft datum. The current aircraft datum may include any current aircraft datum as described herein.

In a non-limiting embodiment, and still referring to FIG. 7, method 700 may include connecting, by an electric aircraft, to a network. The network may include any network as described herein. In some embodiments, the network may include a hub in which communication of data may be permissible. For example and without limitation, an electric aircraft may connect to the computing device via the network wherein the computing device is incorporated in a charging station of a charging connector. The charging station may include any charging station as described herein. Persons skilled in the art, upon reviewing the entirety of this disclosure, will be aware of the various embodiments of connecting to a network in the context of secure data communication.

With continued reference to FIG. 7, method 700, at step 720, may include verifying, by an authentication module, the authentication datum. The authentication module may be consistent with any authentication module as described herein. In a non-limiting embodiment, method 700 may include receiving, by the authentication module, a credential from an electric aircraft of the plurality of electric aircrafts, comparing the credential to an authorized credential stored within an authentication database, and authenticating for the electric aircraft as a function of the comparison. The credential may include any credential as described herein. The credential may be consistent with the authentication datum as described herein. Persons skilled in the art, upon reviewing the entirety of this disclosure, will be aware of the various embodiments of authenticating and/or verifying information in the context of data communication.

Still referring to FIG. 7, method 700, at step 725, transmitting, by the computing device, an aircraft update datum to the electric aircraft as a function of the verification of the authentication datum. The aircraft update datum may include any aircraft update datum as described herein. In some embodiments the aircraft update datum may be retrieved from an aircraft datum database. In a non-limiting embodiment, method 700 may include receiving, by the computing device, a current aircraft datum of the electric aircraft, checking if the current aircraft datum is up to date, and transmitting the aircraft update datum as a function of the check. In another non-limiting embodiment, method 700 may include generating a confirmation receipt as a function of the current aircraft datum, wherein the current aircraft datum is identical to the aircraft update datum. In some embodiments, method 700 may include generating the aircraft update datum wherein the aircraft update datum further comprises a recharging appointment datum. Method 700 may include enabling, by the computing device, charging of the electric aircraft as a function of the verification of the authentication datum.

Figure 8:
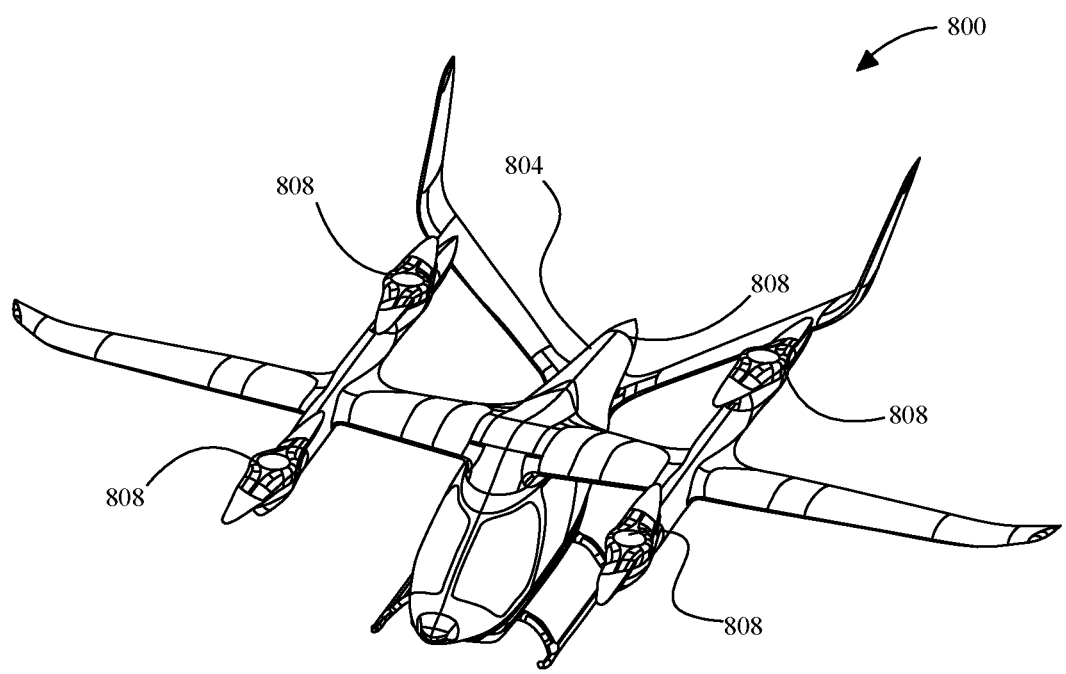
FIG. 8 is an illustration of an exemplary embodiment of an electric aircraft.

Referring now to FIG. 8, an exemplary embodiment of an aircraft 800 is illustrated. Aircraft 800 may be consistent with aircraft 104. In an embodiment, aircraft 800 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 800 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, and titled "AN INTEGRATED ELECTRIC PROPULSION ASSEMBLY," the entirety of which is incorporated herein by reference.

With continued reference to FIG. 8, as used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 800, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight," as described herein, is where the aircraft is capable of flight using wings and/or foils that generate lift caused by the aircraft's forward airspeed and the shape of the wings and/or foils, such as airplane-style flight.

Still referring to FIG. 8, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 804 may include structural elements that physically support a shape and structure of an aircraft. Structural elements may take a plurality of forms, alone or in combination with other types. Structural elements may vary depending on a construction type of aircraft such as without limitation a fuselage 804. Fuselage 804 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 8, aircraft fuselage 804 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 804 orthogonal to a longitudinal (nose to tail) axis of the aircraft and may form a general shape of fuselage 804. A former may include differing cross-sectional shapes at differing locations along fuselage 804, as the former is the structural element that informs the overall shape of a fuselage 804 curvature. In embodiments, aircraft skin may be anchored to formers and strings such that the outer mold line of a volume encapsulated by formers and stringers includes the same shape as aircraft 800 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

Still referring to FIG. 8, aircraft 800 may include a plurality of flight components 808. As used in this disclosure a "flight component" is a component that promotes flight and guidance of an aircraft. In an embodiment, flight component 808 may be mechanically coupled to an aircraft. Plurality of flight components 808 may include flight component 108. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 8, plurality of flight components 808 may include at least a landing gear. The landing gear may be consistent with any landing gear as described in the entirety of this disclosure. In another embodiment, plurality of flight components 808 may include at least a propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis.

In an embodiment, and still referring to FIG. 8, plurality of flight components 808 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a assembly. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 8, plurality of flight components 808 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1045 N to force aircraft to in a horizontal direction along the longitudinal axis. As a further non-limiting example, pusher component may twist and/or rotate to pull air behind it and, at the same time, push aircraft 800 forward with an equal amount of force. In an embodiment, and without limitation, the more air forced behind aircraft, the greater the thrust force with which aircraft 800 is pushed horizontally will be. In another embodiment, and without limitation, forward thrust may force aircraft 800 through the medium of relative air. Additionally or alternatively, plurality of flight components 808 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 9:
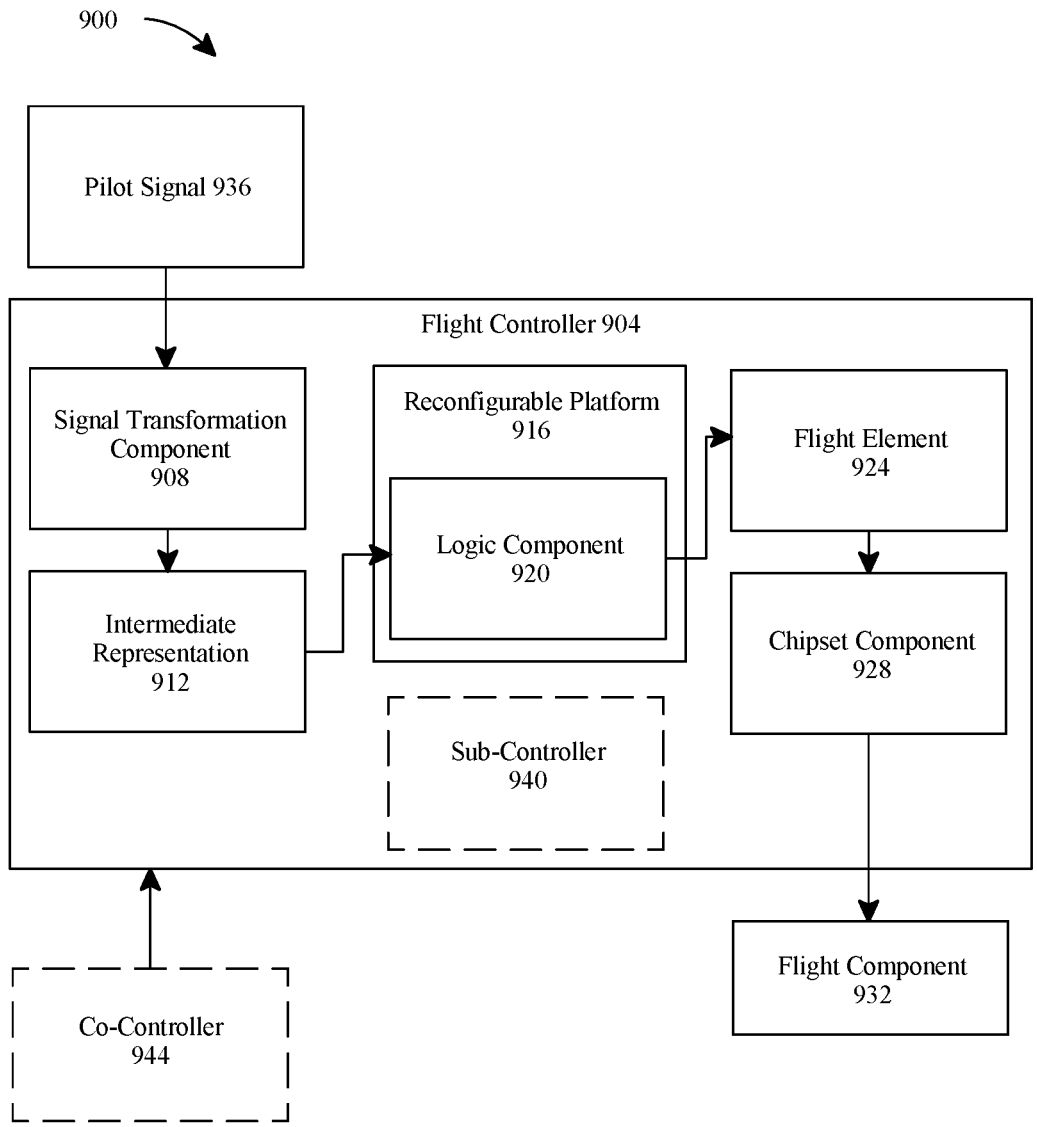
FIG. 9 is a block diagram of an exemplary embodiment of a flight controller.

Now referring to FIG. 9, an exemplary embodiment 900 of a flight controller 904 is illustrated. Flight controller 904 may be consistent with any flight controller 116 as described herein. As used in this disclosure a "flight controller" is a computing device of a plurality of computing devices dedicated to data storage, security, distribution of traffic for load balancing, and flight instruction. Flight controller 904 may include and/or communicate with any computing device as described in this disclosure, including without limitation a microcontroller, microprocessor, digital signal processor (DSP) and/or assembly on a chip (SoC) as described in this disclosure. Further, flight controller 904 may include a single computing device operating independently, or may include two or more computing device operating in concert, in parallel, sequentially or the like; two or more computing devices may be included together in a single computing device or in two or more computing devices. In a non-limiting embodiment, assembly 90 may include a computing device wherein the computing device may include flight controller 904 configured to facilitate communication between a plurality of aircrafts and their flight controllers. In embodiments, flight controller 904 may be installed in an aircraft, may control the aircraft remotely, and/or may include an element installed in the aircraft and a remote element in communication therewith. In some embodiments, flight controller 904 may be configured to generate a node as described in FIG. 1.

In an embodiment, and still referring to FIG. 9, flight controller 904 may include a signal transformation component 908. As used in this disclosure a "signal transformation component" is a component that transforms and/or converts a first signal to a second signal, wherein a signal may include one or more digital and/or analog signals. For example, and without limitation, signal transformation component 908 may be configured to perform one or more operations such as preprocessing, lexical analysis, parsing, semantic analysis, and the like thereof. In an embodiment, and without limitation, signal transformation component 908 may include one or more analog-to-digital convertors that transform a first signal of an analog signal to a second signal of a digital signal. For example, and without limitation, an analog-to-digital converter may convert an analog input signal to a 9-bit binary digital representation of that signal. In another embodiment, signal transformation component 908 may include transforming one or more low-level languages such as, but not limited to, machine languages and/or assembly languages. For example, and without limitation, signal transformation component 908 may include transforming a binary language signal to an assembly language signal. In an embodiment, and without limitation, signal transformation component 908 may include transforming one or more high-level languages and/or formal languages such as but not limited to alphabets, strings, and/or languages. For example, and without limitation, high-level languages may include one or more assembly languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 9, signal transformation component 908 may be configured to optimize an intermediate representation 912. As used in this disclosure an "intermediate representation" is a data structure and/or code that represents the input signal. Signal transformation component 908 may optimize intermediate representation as a function of a data-flow analysis, dependence analysis, alias analysis, pointer analysis, escape analysis, and the like thereof. In an embodiment, and without limitation, signal transformation component 908 may optimize intermediate representation 912 as a function of one or more inline expansions, dead code eliminations, constant propagation, loop transformations, and/or automatic parallelization functions. In another embodiment, signal transformation component 908 may optimize intermediate representation as a function of a machine dependent optimization such as a peephole optimization, wherein a peephole optimization may rewrite short sequences of code into more efficient sequences of code. Signal transformation component 908 may optimize intermediate representation to generate an output language, wherein an "output language," as used herein, is the native machine language of flight controller 904. For example, and without limitation, native machine language may include one or more binary and/or numerical languages.

In an embodiment, and still referring to FIG. 9, flight controller 904 may include a reconfigurable hardware platform 916. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 916 may be reconfigured to enact any algorithm and/or algorithm selection process received from another computing device and/or created using machine-learning processes.

Still referring to FIG. 9, reconfigurable hardware platform 916 may include a logic component 920. As used in this disclosure a "logic component" is a component that executes instructions on output language. For example, and without limitation, logic component may perform basic arithmetic, logic, controlling, input/output operations, and the like thereof. Logic component 920 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 920 may be organized according to Von Neumann and/or Harvard architecture as a non-limiting example. Logic component 920 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or assembly on a chip (SoC). In an embodiment, logic component 920 may include one or more integrated circuit microprocessors, which may contain one or more central processing units, central processors, and/or main processors, on a single metal-oxide-semiconductor chip. Logic component 920 may be configured to execute a sequence of stored instructions to be performed on the output language and/or intermediate representation 912. Logic component 920 may be configured to fetch and/or retrieve the instruction from a memory cache, wherein a "memory cache," as used in this disclosure, is a stored instruction set on flight controller 904. Logic component 920 may be configured to decode the instruction retrieved from the memory cache to opcodes and/or operands. Logic component 920 may be configured to execute the instruction on intermediate representation 912 and/or output language. For example, and without limitation, logic component 920 may be configured to execute an addition operation on intermediate representation 912 and/or output language.

In an embodiment, and without limitation, logic component 920 may be configured to calculate a flight element 924. As used in this disclosure a "flight element" is an element of datum denoting a relative status of aircraft. For example, and without limitation, flight element 924 may denote one or more torques, thrusts, airspeed velocities, forces, altitudes, groundspeed velocities, directions during flight, directions facing, forces, orientations, and the like thereof. For example, and without limitation, flight element 924 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 924 may denote that aircraft is following a flight path accurately and/or sufficiently.

In an embodiment, and still referring to FIG. 9, flight controller 904 may be configured generate an autonomous function. As used in this disclosure an "autonomous function" is a mode and/or function of flight controller 904 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 924. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 904 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 904 will control the ailerons and/or rudders. As used in this disclosure "non-autonomous mode" is a mode that denotes a pilot will control aircraft and/or maneuvers of aircraft in its entirety.

In an embodiment, and still referring to FIG. 9, flight controller 904 may generate autonomous function as a function of an autonomous machine-learning model. As used in this disclosure an "autonomous machine-learning model" is a machine-learning model to produce an autonomous function output given flight element 924 and a pilot signal 936 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 936 may denote that a pilot is controlling and/or maneuvering ailerons, wherein the pilot is not in control of the rudders and/or propulsors. In an embodiment, pilot signal 936 may include an implicit signal and/or an explicit signal. For example, and without limitation, pilot signal 936 may include an explicit signal, wherein the pilot explicitly states there is a lack of control and/or desire for autonomous function. As a further non-limiting example, pilot signal 936 may include an explicit signal directing flight controller 904 to control and/or maintain a portion of aircraft, a portion of the flight plan, the entire aircraft, and/or the entire flight plan. As a further non-limiting example, pilot signal 936 may include an implicit signal, wherein flight controller 904 detects a lack of control such as by a malfunction, torque alteration, flight path deviation, and the like thereof. In an embodiment, and without limitation, pilot signal 936 may include one or more explicit signals to reduce torque, and/or one or more implicit signals that torque may be reduced due to reduction of airspeed velocity. In an embodiment, and without limitation, pilot signal 936 may include one or more local and/or global signals. For example, and without limitation, pilot signal 936 may include a local signal that is transmitted by a pilot and/or crew member. As a further non-limiting example, pilot signal 936 may include a global signal that is transmitted by air traffic control and/or one or more remote users that are in communication with the pilot of aircraft. In an embodiment, pilot signal 936 may be received as a function of a tri-state bus and/or multiplexor that denotes an explicit pilot signal should be transmitted prior to any implicit or global pilot signal.

Still referring to FIG. 9, autonomous machine-learning model may include one or more autonomous machine-learning processes such as supervised, unsupervised, or reinforcement machine-learning processes that flight controller 904 and/or a remote device may or may not use in the generation of autonomous function. As used in this disclosure "remote device" is an external device to flight controller 904. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 9, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 904 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 9, flight controller 904 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 904. Remote device and/or FPGA may transmit a signal, bit, datum, or parameter to flight controller 904 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 904 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 9, flight controller 904 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 9, flight controller 904 may include, but is not limited to, for example, a cluster of flight controllers in a first location and a second flight controller or cluster of flight controllers in a second location. Flight controller 904 may include one or more flight controllers dedicated to data storage, security, distribution of traffic for load balancing, and the like. Flight controller 904 may be configured to distribute one or more computing tasks as described below across a plurality of flight controllers, which may operate in parallel, in series, redundantly, or in any other manner used for distribution of tasks or memory between computing devices. For example, and without limitation, flight controller 904 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

Still referring to FIG. 9, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 9, flight controller may include a sub-controller 940. As used in this disclosure a "sub-controller" is a controller and/or component that is part of a distributed controller as described above; for instance, flight controller 904 may be and/or include a distributed flight controller made up of one or more sub-controllers. For example, and without limitation, sub-controller 940 may include any controllers and/or components thereof that are similar to distributed flight controller and/or flight controller as described above. Sub-controller 940 may include any component of any flight controller as described above. Sub-controller 940 may be implemented in any manner suitable for implementation of a flight controller as described above. As a further non-limiting example, sub-controller 940 may include one or more processors, logic components and/or computing devices capable of receiving, processing, and/or transmitting data across the distributed flight controller as described above. As a further non-limiting example, sub-controller 940 may include a controller that receives a signal from a first flight controller and/or first distributed flight controller component and transmits the signal to a plurality of additional sub-controllers and/or flight components.

Still referring to FIG. 9, flight controller may include a co-controller 944. As used in this disclosure a "co-controller" is a controller and/or component that joins flight controller 904 as components and/or nodes of a distributer flight controller as described above. For example, and without limitation, co-controller 944 may include one or more controllers and/or components that are similar to flight controller 904. As a further non-limiting example, co-controller 944 may include any controller and/or component that joins flight controller 904 to distributer flight controller. As a further non-limiting example, co-controller 944 may include one or more processors, logic components and/or computing devices capable of receiving, processing, and/or transmitting data to and/or from flight controller 904 to distributed flight control assembly. Co-controller 944 may include any component of any flight controller as described above. Co-controller 944 may be implemented in any manner suitable for implementation of a flight controller as described above.

In an embodiment, and with continued reference to FIG. 9, flight controller 904 may be designed and/or configured to perform any method, method step, or sequence of method steps in any embodiment described in this disclosure, in any order and with any degree of repetition. For instance, flight controller 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example, an authentication datum and/or current aircraft datum may be inputs for an aircraft update datum output.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to specific flight information associated with an electric aircraft and/or level of authority or access for a user of electric aircraft for which a subset of training data may be selected.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include the authentication datum and/or current aircraft datum as described above as inputs, the aircraft update datum as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
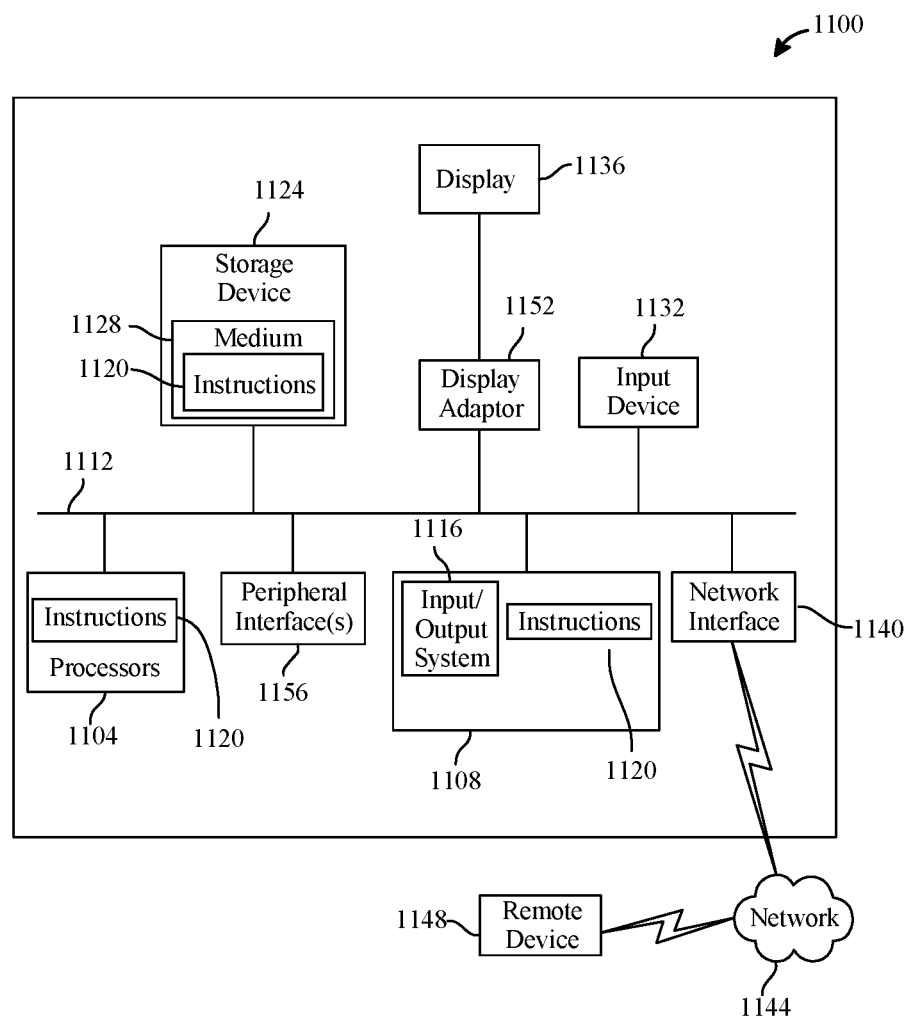
FIG. 11 is a block diagram of a computing assembly that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, assemblies, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An assembly for authenticated communication of data during recharge of a manned electric aircraft, the assembly comprising:
    a charging connector comprising a proximity sensor, wherein the charging connector is configured to:
        receive a current aircraft datum from the manned electric aircraft as a function of a proximity sensor, wherein the current aircraft datum comprises at least a charge parameter; and
        mate with an electric aircraft port of the manned electric aircraft, wherein mating comprises mechanically connecting the charging connector with the manned electric aircraft;
    a computing device communicatively connected to the charging connector, the computing device comprising a processor, wherein the processor is configured to:
        establish a communication link with the manned electric aircraft;
        receive an authentication datum from the manned electric aircraft;
        verify the authentication datum as a function of an authentication module; and
        transmit an aircraft update datum to the manned electric aircraft as a function of the verification of the authentication datum,
        wherein the computing device is configured to incorporate into the aircraft update datum a verification receipt confirming the verification of the authentication datum, and
        wherein in response to the current aircraft datum being identical to the aircraft update datum, the computing device is further configured to include a confirmation receipt indicating that the current aircraft datum is identical to the aircraft update datum.

2. The assembly of claim 1, wherein the authentication module is configured to:
    receive a credential from the manned electric aircraft;
    compare the credential to an authorized credential stored within an authentication database; and
    authenticate the manned electric aircraft as a function of the comparison.

3. The assembly of claim 1, wherein the computing device is further configured to establish the communication link prior to the charging connector mating with the electric aircraft port.

4. The assembly of claim 1, wherein the computing device is further configured to:
    receive the current aircraft datum of the manned electric aircraft;
    check if the current aircraft datum is up to date; and
    transmit the aircraft update datum as a function of the check.

5. The assembly of claim 4, wherein the aircraft update datum is transmitted to the manned electric aircraft through a communication from one or both of the charging connector and the computing device.

6. The assembly of claim 5, wherein the aircraft update datum further comprises a recharging appointment datum, wherein the recharging appointment datum comprises a history of all recharging appointments of the manned electric aircraft, and wherein the history of all the recharging appointments is transmitted by the computing device to the manned electric aircraft.

7. The assembly of claim 1, wherein the aircraft update datum comprises a flight plan update comprising alteration of a post-charging flight plan of the manned electric aircraft to include a layover at a secondary location during the post-charging flight plan.

8. The assembly of claim 1, wherein the computing device is further configured to enable charging of the manned electric aircraft as a function of the verification of the authentication datum.

9. The assembly of claim 1, wherein the computing device is further configured to receive the aircraft update datum from an aircraft datum database.

10. A method for authenticated communication of data during recharge of a manned electric aircraft, the method comprising:
    receiving, at a charging connector comprising a proximity sensor, a current aircraft datum from the manned electric aircraft as a function of the proximity sensor, wherein the current aircraft datum comprises at least a charge parameter;
    mating, by the charging connector, with an electric aircraft port of the manned electric aircraft, wherein mating comprises mechanically connecting the charging connector with the manned electric aircraft;

establishing, by a processor of a computing device, a communication link with the manned electric aircraft;

receiving an authentication datum from the manned electric aircraft;

verifying, by an authentication module, the authentication datum; and transmitting, by the processor, an aircraft update datum to the manned electric aircraft as a function of the verification of the authentication datum, wherein the computing device is configured to incorporate into the aircraft update datum a verification receipt confirming the verification of the authentication datum, and wherein in response to the current aircraft datum being identical to the aircraft update datum, the computing device is further configured to include a confirmation receipt indicating that the current aircraft datum is identical to the aircraft update datum.

11. The assembly of claim 1, wherein the verification receipt enables recharging to the manned electric aircraft by the charging connector and transferring of the aircraft update datum to the manned electric aircraft during the recharging to the manned electric aircraft.

12. The assembly of claim 1, further including a first communication link between the charging connector and the manned electric aircraft for charging the manned electric aircraft and a second communication link separate from the first communication link for transmitting the aircraft update datum to the manned electric aircraft.

13. The method of claim 10, wherein verifying the authentication datum comprises:

receiving, by the authentication module, a credential from the manned electric aircraft;

comparing the credential to an authorized credential stored within an authentication database; and authenticating the manned electric aircraft as a function of the comparison.

14. The method of claim 10, wherein establishing the communication link further comprises establishing the communication link prior to the charging connector mating with the electric aircraft port.

15. The method of claim 10, wherein the method further comprises:

receiving, by the computing device, the current aircraft datum of the manned electric aircraft;

checking if the current aircraft datum is up to date; and transmitting the aircraft update datum as a function of the check.

16. The method of claim 15, wherein the aircraft update datum is transmitted to the manned electric aircraft through a communication from one or both of the charging connector and the computing device.

17. The method of claim 16, wherein the aircraft update datum further comprises a recharging appointment datum, wherein the recharging appointment datum comprises a history of all recharging appointments of the manned electric aircraft, and wherein the history of all the recharging appointments is transmitted by the computing device to the manned electric aircraft.

18. The method of claim 10, wherein the aircraft update datum comprises a flight plan update comprising alteration of a post-charging flight plan of the manned electric aircraft to include a layover at a secondary location during the post-charging flight plan.

19. The method of claim 10, wherein the method further comprises enabling, by the computing device, charging of the manned electric aircraft as a function of the verification of the authentication datum.

20. The method of claim 10, wherein the method further comprises receiving, by the computing device, the aircraft update datum from an aircraft datum database.

* * * * *